US010485154B2

(12) United States Patent
Connell et al.

(10) Patent No.: US 10,485,154 B2
(45) Date of Patent: Nov. 26, 2019

(54) GROUND-ENGAGING IMPLEMENT WITH LATERAL POSITION ADJUSTMENT

(71) Applicant: Deere & Company, Moline, IL (US)

(72) Inventors: Richard J. Connell, Slater, IA (US); Brandon M. McDonald, Johnston, IA (US); Larry L. Hendrickson, Grimes, IA (US)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 15/693,147

(22) Filed: Aug. 31, 2017

(65) Prior Publication Data
US 2018/0325010 A1 Nov. 15, 2018

Related U.S. Application Data

(60) Provisional application No. 62/544,267, filed on Aug. 11, 2017, provisional application No. 62/505,842, filed on May 12, 2017.

(51) Int. Cl.
A01B 63/00 (2006.01)
A01B 79/02 (2006.01)
(Continued)

(52) U.S. Cl.
CPC ............ *A01B 63/004* (2013.01); *A01B 49/06* (2013.01); *A01B 59/002* (2013.01); *A01B 59/043* (2013.01); *A01B 59/0415* (2013.01); *A01B 63/245* (2013.01); *A01B 63/28* (2013.01); *A01B 69/004* (2013.01); *A01B 79/02* (2013.01); *A01C 5/08* (2013.01); *A01C 7/06* (2013.01);
(Continued)

(58) Field of Classification Search
CPC ..... A01B 63/004; A01B 63/245; A01B 63/28; A01B 49/06; A01B 59/002; A01B 59/0415; A01B 59/043; A01B 69/04; A01B 79/02
See application file for complete search history.

(56) References Cited

U.S. PATENT DOCUMENTS 2,160,243 A   5/1939   Webb
2,713,836 A   7/1955   Ajero
(Continued)

FOREIGN PATENT DOCUMENTS

CA   2704593 A1   4/2011
CA   2999077 A1   3/2017
(Continued)

OTHER PUBLICATIONS

European Search Report issued in counterpart application No. 18169834.1 dated Oct. 12, 2018. (8 pages).
(Continued)

Primary Examiner — Tara Mayo-Pinnock

(57) ABSTRACT

A data processor determines whether a draft force on the implement is unbalanced based on an error between the observed implement angle and a target implement heading exceeding a threshold deviation. The data processor is adapted to generate a control signal to compensate for the imbalance in the draft force by adjusting the first lateral position via the first actuator, or by adjusting the second lateral position via the second actuator, the first actuator and the second actuator being positioned on opposite lateral sides of the implement.

10 Claims, 15 Drawing Sheets

(51) Int. Cl.
| | |
|---|---|
| *A01B 49/06* | (2006.01) |
| *A01B 63/28* | (2006.01) |
| *A01C 5/08* | (2006.01) |
| *A01C 7/06* | (2006.01) |
| *A01C 21/00* | (2006.01) |
| *A01B 59/043* | (2006.01) |
| *A01B 59/041* | (2006.01) |
| *A01B 59/00* | (2006.01) |
| *G01D 5/12* | (2006.01) |
| *A01B 63/24* | (2006.01) |
| *A01B 69/00* | (2006.01) |
| *A01C 7/20* | (2006.01) |
| *A01B 69/04* | (2006.01) |
| *A01B 73/04* | (2006.01) |
| *A01C 23/02* | (2006.01) |
| *A01B 15/18* | (2006.01) |
| *A01C 5/06* | (2006.01) |
| *A01C 7/10* | (2006.01) |
| *A01C 15/00* | (2006.01) |
| *G01S 19/41* | (2010.01) |

(52) U.S. Cl.
CPC ............ *A01C 7/201* (2013.01); *A01C 21/005* (2013.01); *G01D 5/12* (2013.01); *A01B 15/18* (2013.01); *A01B 69/008* (2013.01); *A01B 73/044* (2013.01); *A01C 5/062* (2013.01); *A01C 5/064* (2013.01); *A01C 5/068* (2013.01); *A01C 7/102* (2013.01); *A01C 7/206* (2013.01); *A01C 15/006* (2013.01); *A01C 23/024* (2013.01); *G01S 19/41* (2013.01)

(56) References Cited

U.S. PATENT DOCUMENTS

| | | | |
|---|---|---|---|
| 3,140,745 A * | 7/1964 | Pope | A01B 13/08 172/256 |
| 3,208,535 A | 9/1965 | Fischer | |
| 3,454,285 A | 7/1969 | Van Peursem | |
| 3,566,759 A * | 3/1971 | Gurries | E01C 19/006 172/4.5 |
| 3,571,956 A | 3/1971 | Heiberg | |
| 3,633,679 A | 1/1972 | Dahlberg | |
| 4,054,007 A | 10/1977 | Moore | |
| 4,463,811 A | 8/1984 | Winter | |
| 4,611,545 A | 9/1986 | Nickeson et al. | |
| 4,702,323 A | 10/1987 | Smit et al. | |
| 4,762,075 A | 8/1988 | Halford | |
| 5,248,090 A | 9/1993 | Williamson | |
| 5,394,945 A | 3/1995 | Desmarais | |
| 5,884,204 A | 3/1999 | Orbach et al. | |
| 6,041,582 A | 3/2000 | Tiede et al. | |
| 6,070,673 A | 6/2000 | Wendte | |
| 6,434,462 B1 | 8/2002 | Bevly et al. | |
| 6,553,299 B1 | 4/2003 | Keller et al. | |
| 6,688,403 B2 | 2/2004 | Bernhardt et al. | |
| 7,559,569 B2 | 7/2009 | Nejsum | |
| 7,563,053 B2 * | 7/2009 | Tyhy | E01C 19/26 172/684.5 |
| 9,519,861 B1 | 12/2016 | Gates et al. | |
| 2002/0125018 A1 | 9/2002 | Bernhardt et al. | |
| 2006/0162632 A1 | 7/2006 | Bourgault et al. | |
| 2006/0282205 A1 | 12/2006 | Lange | |
| 2010/0017075 A1 | 1/2010 | Beaujot | |
| 2012/0012673 A1 | 1/2012 | Hedegaard | |
| 2013/0074747 A1 | 3/2013 | Schaffert et al. | |
| 2013/0186657 A1 | 7/2013 | Kormann et al. | |
| 2014/0060861 A1 | 3/2014 | Blunier | |
| 2015/0027740 A1 | 1/2015 | Tuttle et al. | |
| 2015/0127230 A1 | 5/2015 | Blunier et al. | |
| 2016/0066500 A1 | 3/2016 | Bruns et al. | |
| 2017/0118901 A1 | 5/2017 | Stark | |
| 2018/0139891 A1 | 5/2018 | Gerber et al. | |
| 2018/0325011 A1 | 11/2018 | Connell | |
| 2018/0325019 A1 | 11/2018 | Connell et al. | |
| 2018/0325020 A1 | 11/2018 | Connell et al. | |
| 2018/0325021 A1 | 11/2018 | Connell et al. | |

FOREIGN PATENT DOCUMENTS

| | | |
|---|---|---|
| CN | 203027683 U | 7/2013 |
| DE | 102015111518 A1 | 1/2017 |
| EP | 2701482 A1 | 3/2014 |
| EP | 3135086 A1 | 3/2017 |
| WO | 2009036575 A1 | 3/2009 |

OTHER PUBLICATIONS

European Search Report issued in counterpart application No. 18169841.6 dated Oct. 12, 2018. (8 pages).
European Search Report issued in counterpart application No. 18169835.8 dated Oct. 15, 2018. (7 pages).
European Search Report issued in counterpart application No. 18169848.1 dated Oct. 12, 2018. (7 pages).
European Search Report issued in counterpart application No. 18171172.2 dated Oct. 16, 2018. (7 pages).
Krishna P. Woli, Agronomic Comparison of Anhydrous Ammonia Applied with a High Speed-Low Draft Opener and Conventional Knife Injection in Corn, Agronomy Journal, 106(3), 881-892, 48 pages.
Maschio Gaspardo North America, In-Furrow Parallelogram Plough, Product Brochure, 8 pages.

* cited by examiner

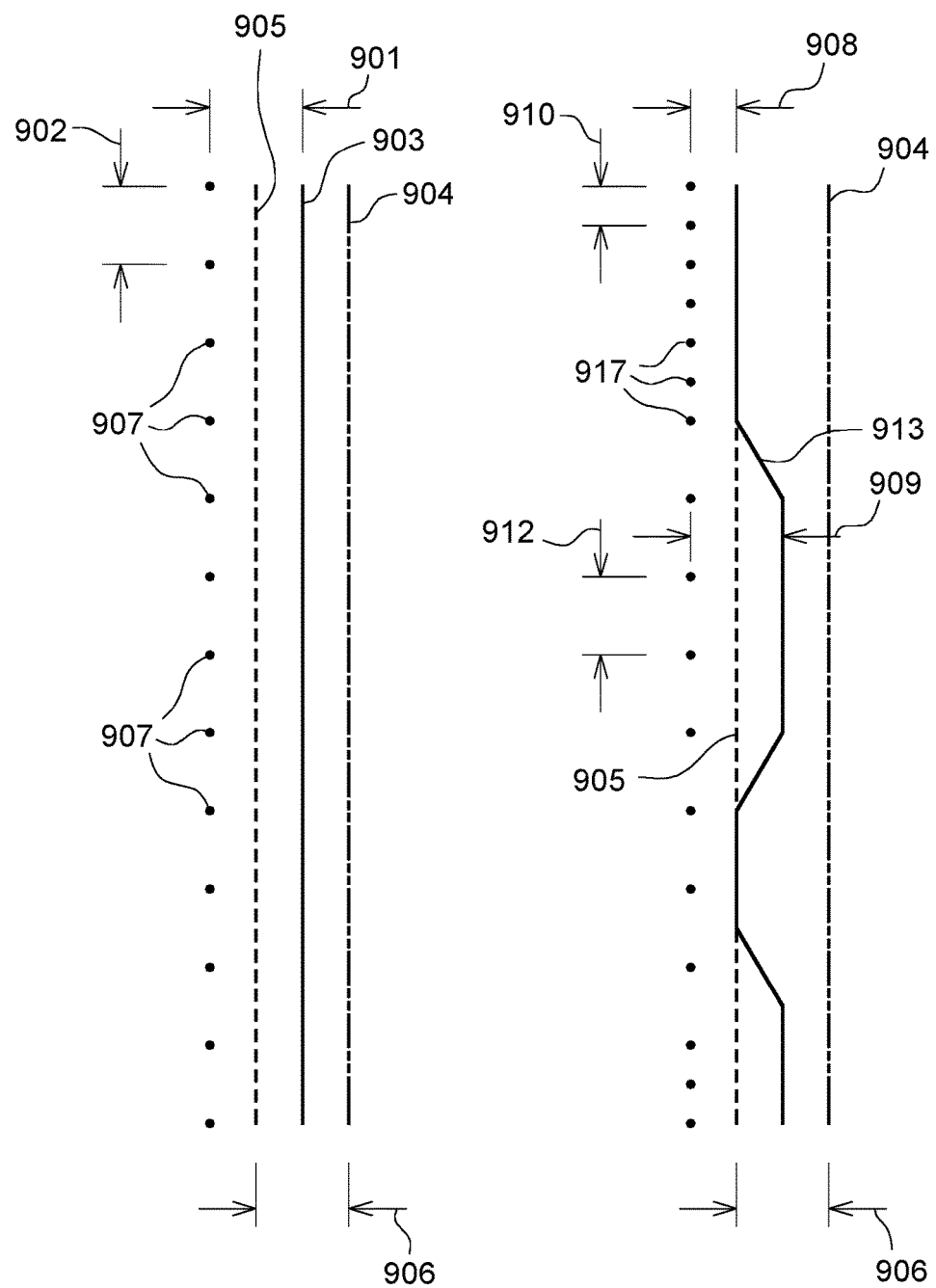

GROUND-ENGAGING IMPLEMENT WITH LATERAL POSITION ADJUSTMENT

RELATED APPLICATION

This document (including the drawings) claims priority and the benefit of the filing date based on U.S. provisional application No. 62/505,842, filed May 12, 2017, and on U.S. provisional application No. 62/544,267, filed Aug. 11, 2017, under 35 U.S.C. § 119 (e), where the above provisional applications are hereby incorporated by reference herein.

FIELD

This disclosure relates to a system and method for a ground-engaging implement with lateral position adjustment.

BACKGROUND

Some prior art implements dispense nitrogen or nutrients to crops onto, into or consistent with middle zone or middle strip between adjacent crop rows. The plants in the crop rows may not have the opportunity to absorb some portion of the nitrogen or nutrients that are dispensed in alignment with a middle zone between adjacent crop rows. Greater dosages or concentrations of nutrients may be required to achieve desired results from placement of nutrients at the middle zone between adjacent rows. Certain growers' costs may increase to purchase greater amounts or concentrations of nutrients, fertilizer or nitrogen to compensate for placement of nutrients at the middle zone. Growers have an opportunity to reduce the amounts of nutrients, fertilizer or nitrogen applied to crops, while maintaining or increasing yields per land unit area, by dispensing nutrients, fertilizer or nitrogen in a target application zone closer to a row of plants or the plant stems than the middle zone. Therefore, there is need for a ground-engaging implement with lateral position adjustment.

SUMMARY

In one embodiment, a ground-engaging agricultural implement system comprises a front member and a hitch connected to the front member. The hitch is associated with a hitch angle sensor for estimating an observed implement angle with respect to the front member, a vehicle heading, or to a longitudinal axis of a vehicle for pulling the hitch. A first rear member is spaced apart from a front member and is positioned generally parallel to the front member. First pivotable arms are generally parallel to each other; the first pivotable arms are rotatably connected to the front member. The first pivotable arms rotatably connected to the first rear member. At least one first opener or first row unit extends downward from or with respect to the first rear member. A first actuator has a first end and a second end opposite the first end. The first end us coupled to one of the first pivotable arms. The second end is coupled to the front member or to the first rear member to adjust a first lateral position of the first opener or first row unit with respect to the front member. A first position sensor estimates the first lateral position of the first opener or first row unit with respect to the front member, where the first position sensor can estimate the first lateral position based on an angle between any first pivotable arm and the front member or the first rear member. A data processor determines whether a draft force on the implement is unbalanced based on an error between the observed implement angle and a target implement heading exceeding a threshold deviation. The data processor is adapted to (e.g., programmed by software instructions) generate a control signal to compensate for the imbalance in the draft force by adjusting the first lateral position via the first actuator, or by adjusting the second lateral position via the second actuator, the first actuator and the second actuator being positioned on opposite lateral sides of the implement.

BRIEF DESCRIPTION OF THE DRAWINGS

FIG. 9A shows a plan view of a row of seeds planted in a generally linear row spaced apart from fertilizer or nutrient in the soil by a substantially uniform distance or separation.

FIG. 9B shows a plan view of a row of seeds planted in a generally linear row with variable seed density and spaced apart from fertilizer or nutrient in the soil by a variable distance or separation.

Like reference numbers in any set of drawings indicate like features or elements.

DETAILED DESCRIPTION OF PREFERRED EMBODIMENTS

Figure 1:
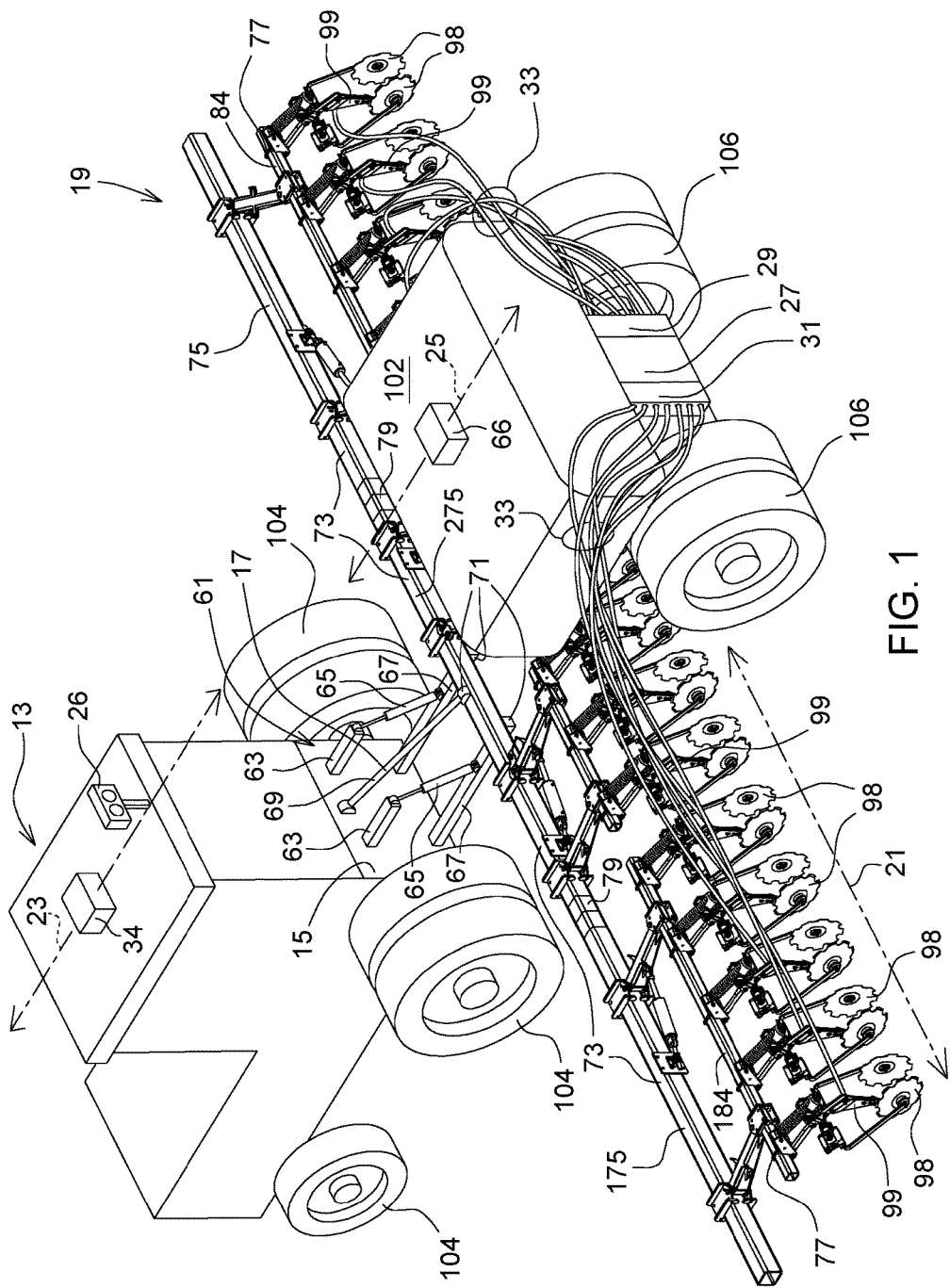
FIG. 1 is perspective rear view of a vehicle towing one embodiment of a system of a ground-engaging implement with lateral position adjustment to apply crop inputs with a lateral offset with respect to one or more plant rows, seed beds, drip tape, irrigation lines or reference lines or curves.

FIG. 1 is perspective rear view of a vehicle 13 towing one embodiment of a ground-engaging implement 19 with lateral position adjustment along, or parallel to, lateral axis 21 to apply crop inputs with an adjustable lateral offset with respect to one or more plant rows, seed beds, drip tape, irrigation lines, reference lines or curves. The lateral axis 21 is substantially perpendicular to the vehicle longitudinal axis 23 of the vehicle, the implement longitudinal axis 25 of the implement 19, or both, FIG. 1 shows that the ground-engaging implement 19 has a tank 102 for holding crop inputs, such as chemicals, nutrients, fertilizer, ammonia, nitrogen, potassium, phosphorus, minerals or other crop input. In an alternate embodiment, the crop inputs may include fungicide, pesticide, herbicide, miticide, or other crop treatments. In one embodiment, a sprayer pump 27 accepts an input of a crop input and pumps the crop input via a first manifold 29 and tubes 33 to a group of corresponding first nozzles or first nutrient knives for application to crop rows of plants or to the ground; similarly, the sprayer pump 27 accepts an input of a crop input and pumps the crop input via a second manifold 31 and tubes 33 to a group of corresponding second nozzles and second nutrient knives for application to crop rows of plants or to the ground.

In another configuration, the tank 102 may contain pressurized ammonia, anhydrous ammonia, or another pressurized crop input that has pressure greater than atmospheric pressure such that the sprayer pump 27 is not required, where the tank 102 directly feeds a first manifold 29, a second manifold 31, and where the first manifold 29 and the second manifold 31 may be associated with pressure regulator to regulate the pressure and flow of the pressurized crop input.

In one embodiment, a ground-engaging agricultural implement 19 comprises a front member 73 for coupling to a hitch 61. For example, the front member 73 may comprise a multi-sectioned foldable member that includes multiple sections. In one embodiment, the front member 73 comprises set of hinged sections that can be folded upward, wherein a central one (e.g., third front member 275) of the hinged sections is associated with a hitch 61 for attachment to a vehicle for pulling or towing the implement. For example, the front member 73 comprises a first front member 75 (e.g., first section), a second front member 175 (e.g., second section) and a third front member 275 (e.g., third section). The first, second and third front members (75, 175, 275) may be hinged at joints or hinges 79 to allow the first front member 75 and the second front member 175 to fold upward with respect to the third front member 275 (e.g., central member) and inward toward the implement longitudinal axis 25 for transportation.

Figure 4:
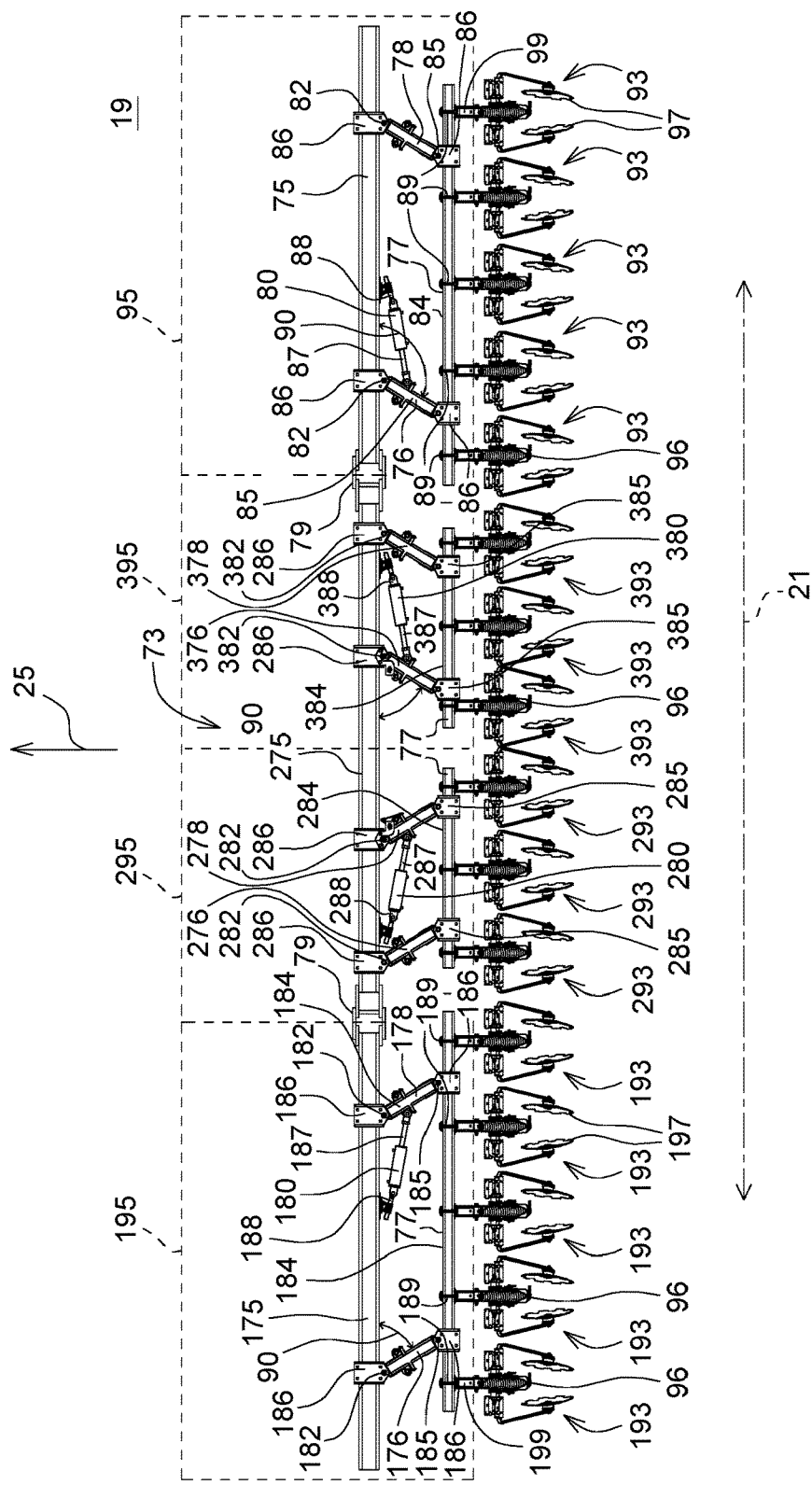
FIG. 4 is a plan perspective view of a one embodiment of a ground-engaging implement with lateral position adjustment.
Figure 6:
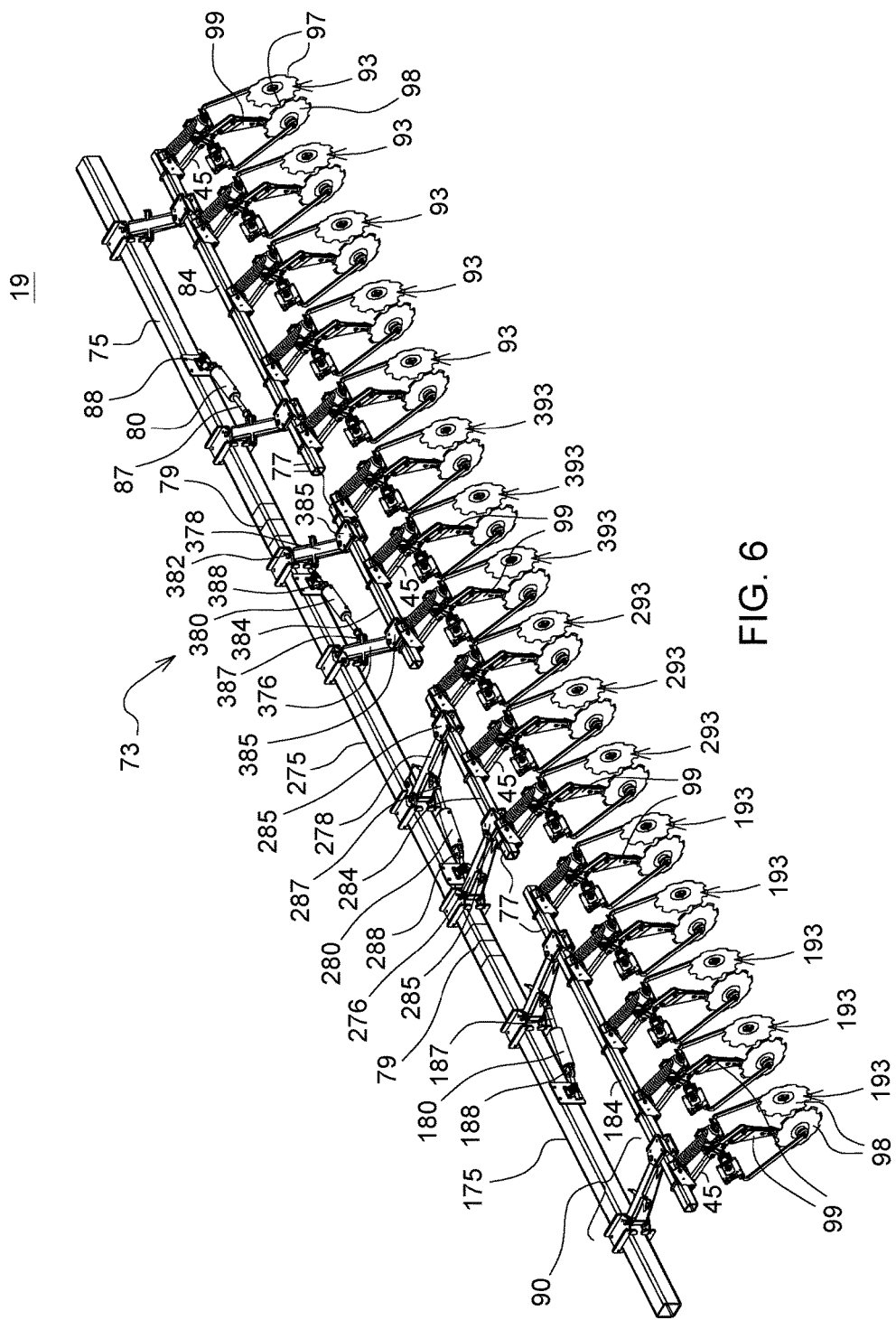
FIG. 6 is a perspective side and rear view of a one embodiment of a ground-engaging implement with lateral position adjustment.

In one embodiment, a set of rear members 77 are associated with the front member 73, which comprises the first front member 75, the second front member 175 and the third front member 275. As best illustrated in FIG. 4 and FIG. 6, four rear members 77 are shown, although virtually any number of rear members greater or equal to two may be used in alternate embodiments. For example, the rear members 77 comprise a first rear member 84 associated with one or more corresponding first row units 93, a second rear member 184 associated with one or more second row units 193, a third rear member 284 associated with one or more corresponding third row units 293 and a fourth rear member 384 associated with one or more corresponding fourth row units 393.

The ground engaging-implement 19 may be regarded as a set of trapezoidal sections (95, 195, 295, 395), where each section is formed by a segment or portion of the front member 73, a segment or portion of the rear member 77, and a pair pivotable arms that pivotally interconnect the corresponding segments of the front member 73 and the rear member 77. Although FIG. 4 illustrates four trapezoidal sections, any number of trapezoidal sections greater than two may be used.

First Trapezoidal Section

As illustrated in FIG. 4 with respect to a first trapezoidal section 95, a first rear member 84 is spaced apart from a segment or portion of the front member 73 and positioned generally parallel to a segment or portion of front member 73. For example, a first rear member 84 is spaced apart from a first front member 75 and positioned generally parallel to the first front member 75. A first pair of first pivotable arms (76, 78) are generally parallel to each other. The first pair of first pivotable arms (76, 78) are rotatably connected to the front member 73 or first front member 75 at two front pivot points 82. The first pair of first pivotable arms (76, 78) are rotatably connected to the first rear member 84 at two rear pivot points 85. As best illustrated in the plan view of FIG. 4, the first front member 75, first pivotable arms (76, 78) and the first rear member 84 collectively form a pivotable, trapezoidal structure that permits the first rear member to move along or parallel to the lateral axis 21, which allows the opener (e.g., nutrient knife 99) or first row units 93 to be laterally adjusted as the vehicle 13 traverses a path, swath, a set of plant rows, a set of seed rows, or planted seedbeds.

At least one first opener (e.g., nutrient knife 99 or projecting, ground-engaging member in FIG. 6) extends downward from or with respect to the first rear member 84. A first actuator 80 has a first end 87 and a second end 88 opposite the first end 87. The first end 87 is coupled to one of the first pivotable arms (76, 78). In one embodiment, the second end 88 is coupled to the front member 73 or first front member 75 to adjust the lateral position of the first row units 93 or the corresponding openers (e.g., nutrient knives 99 or other ground-engaging members). However, in an alternate embodiment the second end 88 can be coupled to a rear member or first rear member 84 to adjust the lateral position of the first row units 93 or the corresponding openers (e.g., nutrient knives 99 or other ground-engaging members). The first actuator 80 increases or decreases the distance or span between the first end 87 and the second end 88 to adjust the lateral position, such as the lateral position of the first rear member 84 with respect to the first front member 75. A first position sensor 68 is arranged to estimate a lateral position of the first row unit 93 with respect to the implement longitudinal axis 25 or any reference point on or associated with the front member 73, or the lateral position of the first opener (e.g., nutrient knife 99) with respect to the implement longitudinal axis 25 or any reference point on or associated with the front member 73. For example, the first position sensor 68 (in FIG. 3) can estimate the lateral position based on an angle 90 between any first pivotable arm (76, 78) and the first front member 75 or the first rear member 84.

Second Trapezoidal Section

In the second trapezoidal section 195, a second rear member 184 is spaced apart from the second front member 175 and positioned generally parallel to the second front member 175. A second pair of second pivotable arms (176, 178) are generally parallel to each other. The second pair of second pivotable arms (176, 178) are rotatably connected to the second front member 175 at two front pivot points 182. The second pair of second pivotable arms (176, 78) are rotatably connected to the second rear member 184 at two rear pivot points 185. As best illustrated in the plan view of FIG. 4, the second front member 175, second pivotable arms (176, 178) and the second rear member 184 collectively form a pivotable, trapezoidal structure that permits the second rear member 184 to move along or parallel to the lateral axis 21, which allows the opener (e.g., nutrient knife 99) or second row units 193 to be laterally adjusted to a second lateral position as the vehicle 13 traverses a path, swath, a set of plant rows, a set of seed rows, or planted seedbeds.

At least one first opener (e.g., nutrient knife 99 or projecting, ground-engaging member) extends downward from or with respect to the second rear member 184. A second actuator 180 has a first end 187 and a second end 188 opposite the first end 187. The first end 187 is coupled to one of the second pivotable arms (176, 178). In one embodiment, the second end 188 is coupled to the front member 73 or second front member 175 to adjust a second lateral position of the second row units 193 or the corresponding openers (e.g., nutrient knives 99 or other ground-engaging members). However, in an alternate embodiment the second end 188 can be coupled to a rear member or second rear member 184 to adjust the lateral position of the second row units 193 or the corresponding openers (e.g., nutrient knives 99 or other ground-engaging members).

The second actuator 180 increases or decreases the distance or span between the first end 187 and the second end 188 to adjust the lateral position, such as the lateral position of the second rear member 184 with respect to the second front member 175. A second position sensor 168 is arranged to estimate a second lateral position of the second row unit 193 with respect to the implement longitudinal axis 25 or any reference point on or associated with the front member 73 or the second front member 175; or the lateral position of the first opener (e.g., nutrient knife 99) with respect to the implement longitudinal axis 25 or any reference point on or associated with the front member 73. For example, the second position sensor 168 (in FIG. 3) can estimate the lateral position based on an angle 90 between any first pivotable arm (76, 78) and the second front member 175 or the second rear member 184.

Third Trapezoidal Section

In the third trapezoidal section 295, a third rear member 284 is spaced apart from the third front member 275 and positioned generally parallel to the third front member 275. A third pair of third pivotable arms (276, 278) are generally parallel to each other. The third pair of third pivotable arms (276, 278) are rotatably connected to the third front member 275 at two front pivot points 282. The third pair of third pivotable arms (276, 278) are rotatably connected to the third rear member 284 at two rear pivot points 285. As best illustrated in the plan view of FIG. 4, the third front member 275, third pivotable arms (276, 278) and the third rear member 284 collectively form a pivotable, trapezoidal structure that permits the third rear member 284 to move along or parallel to the lateral axis 21, which allows the opener (e.g., nutrient knife 99) or third row units 293 to be laterally adjusted to a third lateral position as the vehicle 13 traverses a path, swath, a set of plant rows, a set of seed rows, or planted seedbeds.

At least one first opener (e.g., nutrient knife 99 or projecting, ground-engaging member) extends downward from or with respect to the third rear member 284. A third actuator 280 has a first end 287 and a second end 288 opposite the first end 287. The first end 287 is coupled to one of the third pivotable arms (276, 278). In one embodiment, the second end 288 is coupled to the front member 73 or third front member 275 to adjust the lateral position of the third row units 293 or the opener (e.g., nutrient knives 99 or other ground-engaging members). However, in an alternate embodiment the second end 288 can be coupled to a rear member or third rear member 284 to adjust the lateral position of the third row units 293 or the corresponding openers (e.g., nutrient knives 99 or other ground-engaging members).

The third actuator 280 increases or decreases the distance or span between the first end 287 and the second end 288 to adjust the lateral position, such as the lateral position of the third rear member 284 with respect to the third front member 275. A third position sensor 268 is arranged to estimate a second lateral position of the third row unit s293 with respect to the implement longitudinal axis 25 or any reference point on or associated with the front member 73 or the third front member 275; or the lateral position of the first opener (e.g., nutrient knife 99) with respect to the implement longitudinal axis 25 or any reference point on or associated with the front member 73. For example, the third position sensor 268 can estimate the lateral position based on an angle 90 between any third pivotable arm (276, 278) and the third front member 275 or the third rear member 284.

Fourth Trapezoidal Section

In the fourth trapezoidal section 395, a fourth rear member 384 is spaced apart from the third front member 275 and positioned generally parallel to the third front member 275. A fourth pair of fourth pivotable arms (376, 378) are generally parallel to each other. The fourth pair of fourth pivotable arms (376, 378) are rotatably connected to the third front member 275 at two front pivot points 382. The fourth pair of forth pivotable arms (376, 378) are rotatably connected to the fourth rear member 384 at two rear pivot points 385. As best illustrated in the plan view of FIG. 4, the third front member 275, fourth pivotable arms (376, 378) and the fourth rear member 384 collectively form a pivotable, trapezoidal structure that permits the fourth rear member 384 to move along or parallel to the lateral axis 21, which allows the opener (e.g., nutrient knife 99) or fourth row units 393 to be laterally adjusted to a third lateral position as the vehicle 13 traverses a path, swath, a set of plant rows, a set of seed rows, or planted seedbeds.

At least one first opener (e.g., nutrient knife 99 or projecting, ground-engaging member) extends downward from or with respect to the fourth rear member 384. A fourth actuator 380 has a first end 387 and a second end 388 opposite the first end 387. The first end 387 is coupled to one of the third pivotable arms (376, 378). In one embodiment, the second end 388 is coupled to the front member 73 or third front member 275 to adjust the lateral position of the fourth row units 393 or the corresponding openers (e.g., nutrient knives 99 or other ground engaging members). However, in an alternate embodiment the second end 388 can be coupled to a rear member or fourth rear member 384 to adjust the lateral position of the fourth row units 393 or the corresponding openers (e.g., nutrient knives 99 or other ground-engaging members).

The fourth actuator 380 increases or decreases the distance or span between the first end 387 and the second end 388 to adjust the lateral position, such as the lateral position of the fourth rear member 384 with respect to the third front member 275. A fourth position sensor 368 (in FIG. 3) is arranged to estimate a fourth lateral position of the fourth row unit 393 with respect to the implement longitudinal axis 25 or any reference point on or associated with the front member 73 or the third front member 275; or the lateral position of the first opener (e.g., nutrient knife 99) with respect to the implement longitudinal axis 25 or any reference point on or associated with the front member 73. For example, the fourth position sensor 368 can estimate the lateral position based on an angle 90 between any fourth pivotable arm (376, 378) and the third front member 275 or the fourth rear member 384.

Further, in one embodiment, the first row units 93, the second row units 193, the third row units 293 and the fourth row units 393 can be adjusted laterally and independently of each other. For example, the control system 11 of FIG. 3 can control some row units (e.g., any permutation or combination of 93, 193, 293 or 393) to be centered in the rows while other row units are laterally moved to the right or left, and the lateral position of each separately adjustable set of row units can be continuously adjusted based on the implement position of the implement (e.g., as determined by a an implement location-determining receiver 66) in the field to track a path plan, to avoid obstacles, irrigation lines, or drip tape, or to vary the nutrient proximity to plant roots or seeds based on the soil characteristics, seed specifications, seed planting density, seed varieties/coatings, and agronomic prescription plan.

Hitch

As illustrated in FIG. 1, in one embodiment, a ground-engaging agricultural implement 19 comprises a first front member 73 or third front implement member 275 for coupling to a hitch 61. As illustrated the hitch 61 comprises a three-point hitch assembly, although other hitch configurations can be used. In one embodiment, the hitch 61 comprises a pair of lower arms 67 that extend rearwards from a rear 15 of the vehicle 13, a set of upper arms 63 spaced apart from the lower arms 67, where each of the upper arms 63 is coupled to a corresponding lower arm 67 via one or more adjustable hitch hydraulic cylinders 65 that are capable of adjusting the height of the lower arms 67 and a first front member 75 of the implement 19 that is attached to the lower arms 67 at lower hitch points 71. An intermediate arm 17 extends rearwards from the rear of the vehicle via a flexible linkage and is attachable to the first front member 75 an upper hitch point 69.

As illustrated in FIG. 1, the hitch, such as an upper hitch point 69, may be associated with a hitch angle sensor (e.g., magnetic field sensor 602) to measure an observed implement angle of the implement (or its front member (73, 75)) with respect to one or more of the following: (1) the vehicle longitudinal axis 23 of the vehicle 13, (2) the vehicle heading, (3) an axis the coextensive with the front member. For example, a magnet 600 may be secured to or embedded in the upper hitch point 69 and a magnetic field sensor 602 may be secured on or near a rear of the vehicle 13 to detect a change in magnetic field that indicates an observed implement angle (e.g., hitch angle) of the hitch or implement with respect to the vehicle 13 or the vehicle longitudinal axis 23.

In an alternate embodiment, optional draft force sensors 45 may detect the observed implement angle of the hitch or implement with respect to the vehicle 13 or the vehicle longitudinal axis 23.

In FIG. 1, the vehicle 13 (e.g., tractor) comprises a propulsion unit that can drive or power wheels or tracks that can track or traverse over a guidance path or path plan that is aligned with or coextensive with a center point (or any target offset from the center point) between adjacent crop rows, to minimize damage to plants or seeds from the wheels, tracks or tires. The guidance path may comprise a linear path segment, a curved path, a contour paths or the combination of any of the foregoing paths.

Figure 3:
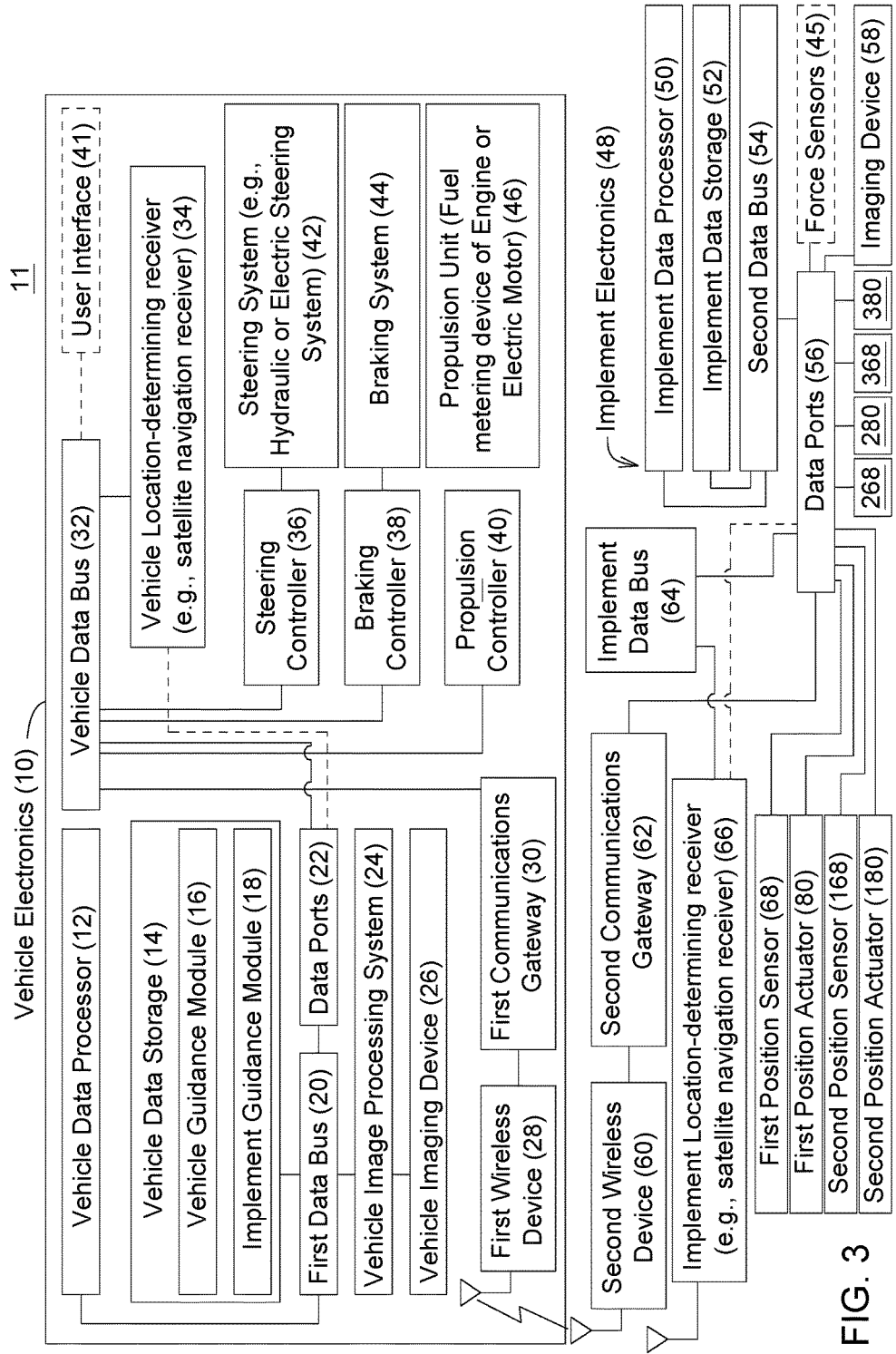
FIG. 3 is one embodiment of a block diagram of control system (e.g., electronics and vehicle software) associated with a ground-engaging implement with lateral position adjustment.

In FIG. 3 in one embodiment, the vehicle is associated with a vehicle location-determining receiver 34, such as a satellite navigation receiver (e.g., with differential correction of the carrier phase of the signal), to estimate a position of the vehicle 13. The path of the vehicle wheels 104 or tires of the vehicle 13 and the path of the implement wheels 106 of the implement 19 can be guided consistent with intercepting or tracking the guidance path or path plan that is aligned with or coextensive with the center point (or any target offset from the center point) between adjacent crop rows. Meanwhile, the ground-engaging implement 19, or its different row units (83, 193, 293 393) can be moved to a lateral position that is independent of maintaining the wheels or tires of the tractor or implement 19 between the plant rows.

Instead, the a control system 11 or data processing system can adjust the lateral position of the ground-engaging implement 19 to have an offset with respect to a row of plants or row of seeds such that the crop inputs (e.g., nutrients, fertilizer, or nitrogen) are directed to or dispensed to a target zone (e.g., an intermediate target zone) that is between the center line between adjacent rows and the plant stems, stalk or trunk of the plant row, or seed bed row, drip tape segment, or irrigation segment.

The implement 19 can be equipped with various ground-engaging assemblies or row units (93, 193, 293, 393). Under a first mode (e.g., nutrient application mode) of operation, row units are designed to apply nitrogen, anhydrous ammonia, fertilizer or other nutrients to rows of plants or seeds that have already been planted. In the first mode, the control system 11 can be provided with as-planted data for the plants or seeds that is based on a location determining receiver, such as a satellite navigation receiver with differential correction, Real Time Kinematic (RTK) correction, or precise point positioning providing the coordinates (e.g., in two or three dimensions) of seeds or rows of plants for the field and a data processing system recording the coordinates of seeds or rows of plants, which can be referred to as as-planted data or planting map data (e.g., historic as-planted data from a planting that occurred earlier for the same field in the same growing season). The as-planted data or planting map data can be stored as files on electronic storage media, non-volatile electronic random access memory, optical disks, magnetic storage medium, in the vehicle data storage 14, in implement data storage 52, or otherwise for input to the user interface of the control system 11, or for wireless communication to the control system 11.

In one embodiment, one or more location-determining receivers (34, 66) determine the position of the implement in the field relative to as-planted seed data, seed density data, or both, where the as-planted seed data or seed density data may include any of the following: seed or plant row coordinates (e.g., two or three dimensions); position points that define linear or curved row segments; linear or quadratic equations that define linear or curved row segments; as-planted seed density data for corresponding linear or curved row segments through one or more fields; seed type and corresponding tolerance to concentration of fertilizer, corrosive components or salts that can dehydrate or damage plant tissue; seed coating (e.g., anti-corrosive, water soluble polymeric coating) of the planted seed and the resistance or tolerance of the seed coating to concentration of fertilizer, corrosive components or salts that can dehydrate or damage plant tissue.

In one configuration, the control system 11 or its vehicle guidance module 16 can guide the vehicle and the implement 19 to track an implement path that has a target lateral offset (e.g., dynamically adjustable lateral offset versus vehicle or implement position) of the ground-engaging elements, openers or knives of the implement with respect to the as-planted data or planting map data. Further, if the as-planted data includes variable seed types, seed coatings, or variable seed density, the target lateral offset is dynamically adjustable versus vehicle or implement position throughout the field responsive to seed type, seed coating, seed density, or soil parameters (e.g., from soil survey). For example, denser seed planting or certain seed types (e.g., feed corn, for livestock consumption, is more tolerant than sweet corn, for human consumption, to salt concentration of fertilizer) may tolerate greater concentrations of fertilizer, such as certain seed varieties or seeds with polymeric buffer coating; therefore, the implement data processor 50 or vehicle guidance module 16 or implement guidance module 18 can decrease the target lateral offset for particular zones of the field with the seeds, seed types or seed coatings that tolerate greater concentrations of fertilizer (e.g., or corrosive compounds or salts) specific zones of higher seed or plant density where more seeds per unit land area are planted. The implement data processor 50 or implement guidance module 18 varies the fixed or the variable lateral offset based on seed density of the planted seed data, such that the first opener (e.g., knife 99) of a first row unit (e.g., 93), second opener (e.g., knife 99) of a second row unit (e.g., 193), or both are aligned with closer lateral offset to the planted seed or plants with greater seed density or closer plant spacing to deliver nutrients. The row units (93, 193, 293, 393) of FIG. 1, FIG. 2, FIG. 4 and FIG. 6 are configured to work in the first mode.

Under a second mode, with any of the row units described in FIG. 5A through FIG. 5D, inclusive, the implement 19 can simultaneously apply nutrients and plant seeds in a single efficient path through the field in a single pass. For example, the first row unit has a first outlet for applying nutrients in a strip and a second outlet for planting seed with a fixed spatial separation determined to avoid damage to the seed for the concentration of nutrients to be applied; and wherein the second row unit has a first outlet for seed and second outlet for nutrients with a fixed spatial separation determined to avoid damage to the seed for the concentration of nutrients to be applied. In one embodiment of the second mode, the implement data processor 50 or implement guidance module 18 does not dynamically vary the lateral offset between the applied nutrient strip and the row of seeds or plants, as in the first mode. Instead, the implement data processor 50 or implement guidance module 18 can fix the lateral offset between the applied nutrient strip and the row of seeds or plants with a certain target lateral offset or target vertical offset to an implement guidance line, curve or implement reference path. As used in this document, the nutrient strip may be composed of linear segments, curved segments, discontinuous segments or other nutrient patterns. One or more location-determining receivers (34, 66) can determine a position of the implement 19 in a field relative to an implement guidance line, curve or implement reference path. Here, the lateral offset, lateral movement or lateral shifting of the different trapezoidal sections or row units can be used for one or more of the following: (1) to balance or equalize draft forces for planting at higher speeds than otherwise possible, (2) to shift the implement position to track a target implement path, and (3) to keep the implement within internal or external field boundaries, such as waterways, field perimeter, or away from irrigation lines and drip tape.

Accordingly, in one embodiment an implement data processor 50 or implement guidance module 18 is adapted to (e.g., programmed with software instructions to) independently or collectively adjust (e.g., to adjust in unison and simultaneously the angle 90 detected by the position sensors (68, 168) to be substantially identical as the lateral shift of the row units (93, 193) occur) the first lateral position of the first opener and the second lateral position of the second opener to track as planted seed data or plant locations in a field with a fixed or variable lateral offset. Further, the implement data processor 50 or implement guidance module 18 can control all or any number of row units in the implement in unison to move in a time-synchronized manner, which means the synchronized row units or electronically ganged row units can sweep through the same identical angles 90 at the same time, to laterally shift the implement 19 to the right or left. The row units (493, 593, 693, 793) of FIG. 5A-FIG. 5D, can support operation in the first mode, or both the first mode and the second mode.

In some embodiments, all of the ground-engaging assemblies or row units (93, 193, 293, 393) (e.g., synchronized row units) of the implement 19 may be moved to have the same offset magnitude and direction with respect to one or more reference rows of plants or seed beds. However, in other embodiments, a first set of first row units 93, such as ground engaging assemblies, may be moved in an opposite direction and equal magnitude to a second set of second row units 193 of the ground engaging assemblies; the first set and second row units may contain an approximately equal number of ground-engaging assemblies or an equal and opposite draft force between the first set and the second set. The draft or draft force is the force that is parallel to the implement longitudinal axis that is required to pull the implement, where the force may vary based on the implement width, the depth of implement engagement in the ground, and the implement velocity or speed. For example, the draft force of each row unit of the implement 19 can depend on the depth and width of the opener, knife or ground engaging components and the velocity or speed of the implement. For operation of the implement 19 at higher speeds in the first mode (e.g., nutrient application) or in a second mode (e.g., simultaneous planting and nutrient application), the implement electronics 48 or control system 11 may use draft compensation to equalize or balance the draft, which can cause lateral deviations that can be tracked and documented in as-planted data. The draft compensation is subject to a maximum limit on the lateral movement that is allowed for draft compensation to avoid damage to an existing seeds, plant rows, irrigation lines, or to maintain internal or external field boundaries, around the field perimeter or obstacles.

The draft may depend upon the interaction of the ground-engaging elements with the soil or ground, such as the compound angle (e.g., pitch, roll and yaw) of each ground-engaging element, such as an opener, coulter or nutrient knife. As illustrated in FIG. 4 and FIG. 6, each ground engaging element, such as the opener or nutrient knife has a corresponding spring 96 that biases each ground engaging-element in a substantially downward direction. For example, the spring 96 is biased to allow the row unit or its ground-engaging element(s) to have a vertical range of travel, or upward pivot rotation, responsive to the application of upward force on the spring 96 from the ground that exceeds the threshold force (e.g., proportional to the spring constant). Accordingly, the spring can provide some protection against bending, breakage, or damage of the ground-engaging elements, at least up until the upward travel is reached.

In one embodiment, the implement 19 comprises toolbar that can laterally move the ground-engaging elements or row units (93, 193, 293, 393) and independently, differently and dynamically to apply precisely nutrients, fertilizer, nitrogen or other crop inputs, which efficacy can be improved via control of the lateral distance from a crop row. For example, a control system 11 can apply nitrogen in a typical corn side-dress application within a target zone of approximately six inches (or approximately 15.24 centimeters) from the row of plant stems or seed bed to enhance the efficiency and effectiveness of that product is increased thereby improving plant yields and nutrient use efficiency. The target zone is located closer to the row of plant stems or seed beds than the typical fifteen inch (e.g., 38.1 centimeter) row spacing for corn in certain regions.

In one embodiment, the implement 19 comprises a frame with a controllable shifting member or actuators (80, 190, 2080, 380) to move sections laterally with respect to rows or plant beds. Each section has one or more row units (93, 193, 293, 393), such as ground-engaging assemblies to cover the entire swath or width of the implement 19. The path of each row unit, section or ground-engaging assembly can be individually controlled relative to a planted crop row, seed bed, drip tape, irrigation line, reference line or reference curve for corresponding zones or locations within a field.

The path of each row unit (93, 193, 293, 393) or section of the implement 19 can be controlled based on position or location data for the implement 19 (its ground-engaging assemblies) or vehicle 13, such as one or more location-determining receivers (34, 66), or associated antennas. If only the vehicle has a vehicle location-determining receiver 34, a kinematic model may estimate the position of the implement 19, a reference point on the implement 19, or a reference point on one or more ground-engaging assemblies or row units (93, 193, 293 or 393) of the implement 19. Further, each section has a position sensor (68, 168, 268, 368), such as an angle sensor or rotary potentiometer, to estimate a lateral offset of the ground-engaging assembly or respective row unit to the implement 19 or an implement 19 reference point (e.g., fixed frame reference point) on the implement 19. The control system 11 can track simultaneously, the independent lateral positions of the respective row units as the implement 19 and vehicle 13 traverse a field.

In one embodiment, the control system of FIG. 3 has a user interface 41 to support setting a lateral offset of the implement 19 or its ground-engaging assemblies from a crop row, seed bed, drip tape, irrigation line, reference line, or reference curve. During a survey of the field or otherwise, reference positions of the crop rows, seed bed, drip tape, irrigation line, reference line or reference curve are stored in a map of the field by a location-determining receiver operating (34, 66) with differential correction, with corrections from real-time kinematic reference receiver, or precise point positioning configurations.

During operation of the implement 19, the implement location-determining receiver 66 estimates an observed implement position (or position of one or more ground-engaging assemblies or row units (93, 193, 293, 393) of the implement 19) with a target lateral offset (e.g., user-definable target lateral offset) to the reference positions of the crop rows, seed bed, drip tape, irrigation line, reference line or reference curve are stored in a map of the field. The actual difference between the reference position and the corresponding observed implement position (or position of one or more ground-engaging assemblies of the implement 19) represents the observed lateral offset.

In one embodiment, an implement location-determining receiver 66 is adapted to determine a position of the implement or a reference position associated with the first front member 75 or front member 73. An implement data processor 50 or implement guidance module 18 is configured to adjust the first lateral position, a second lateral position, a third lateral position, or a fourth lateral position, or any combination of the foregoing lateral positions, based on the determined implement position or the reference position and as-planted data of crop rows in a field to maintain: (1) substantially no lateral offset (e.g., less any tracking error) to an implement path plan or implement guidance line for one or more implement locations, vehicle locations or zones within the field, or (2) a target lateral offset between an opener or row unit and the crop row (e.g., seed row or plant row) for one or more implement locations, vehicle locations or zones within the field, (3) a target lateral offset or between an opener or row unit and irrigation line positions in a field, drip tape positions in a field, internal field boundaries, external field boundaries, waterways or obstructions.

The observed lateral offset can be adjusted automatically by measuring an error with respect to the crop row, seed bed, drip tape, irrigation line, reference line, or reference curve, and to automatically adjust the observed lateral offset to meet or approach a target lateral offset to reduce or attempt to reduce the position or tracking error to zero. The automatic adjustment by the implement data processor 50 can compensate for or remove the error of the fixed implement 19 frame drift relative to vehicle position and crop positions.

In an alternate embodiment, a vehicle imaging device 26, an implement imaging device 58, or both, and image processing system 24 can estimate the observed lateral offset or the error of the ground-engaging assemblies with respect to the crop position of the crop rows, planted seeds, seed bed, drip tape, irrigation line, reference line or reference curve are stored in a map of the field.

In another embodiment, the existing crop row using row feelers or tactile sensors can adjust the lateral offset of the implement 19 relative to remain precisely aligned with the target lateral offset relative to crop row, the seed bed, drip tape, irrigation line, reference line or reference curve.

The ground-engaging assembly or nutrient knife could be any type of applicator for nitrogen, ammonia, fertilizer, that places the nutrients in a band beneath, in or on the soil.

Further, the ground engaging assembly may support planting and fertilization of the seeds in a single pass through the field, which saves time and fuel and reduces input costs for growers. A closer, roller or wavy disc is associated with the each row unit (93, 193, 293, 393), where roller or wavy disc follows the nutrient knife to cover any injected or applied nutrient with soil. The closer 98 may have notches 97, such as scalloped edges.

Figure 2:
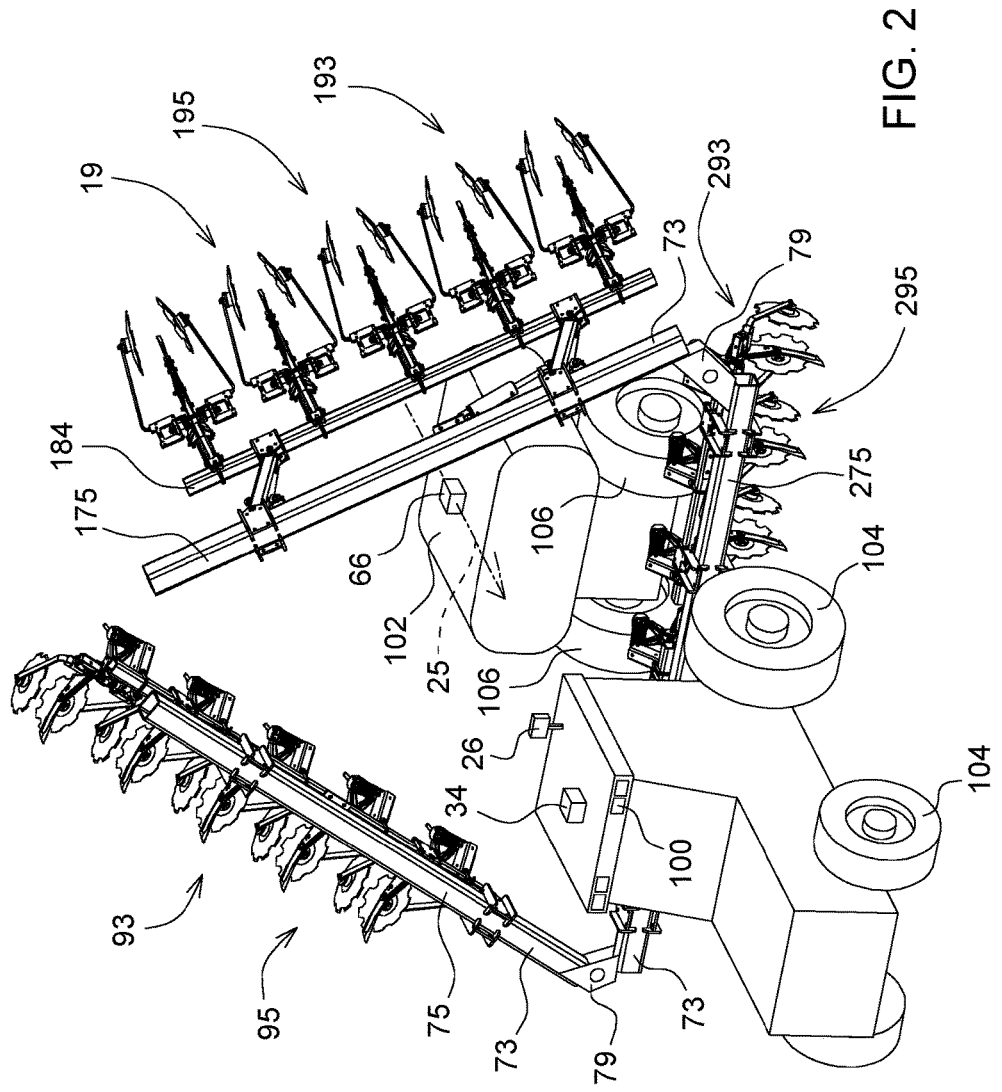
FIG. 2 is perspective front view of a system for ground-engaging implement with lateral position adjustment in an arrangement that is foldable to become more compact for transportation purposes.

FIG. 2 is perspective front view of a ground-engaging implement 19 that can be pulled or towed by a vehicle 13, such as tractor. The ground-engaging implement 19 with lateral position adjustment in an arrangement that is foldable to become more compact for transportation purposes. A first trapezoidal section 95 and second trapezoidal section 195 are folded up with respect to a central trapezoidal sections, such as the third and fourth trapezoidal sections (295, 395).

In one embodiment, the first front member 75 pivots upward with respect to the third front member 275 at hinge 79, whereas the second front member 175 pivots upward with respect to the third front member 275 at hinge 79. In one embodiment, an operator can manually unlock the hinge 79 by moving or disengaging a pin, bolt or otherwise to manually rotate the first front member 75 and the attached row units 93 upward into a locking position. Similarly, the operator can manually unlock the hinge 79 by moving or disengaging a pin, bolt or otherwise to manually rotate the second member 175 and the attached row units 193 upward into a locking position.

In an alternate embodiment, a primary actuator, such as a primary hydraulic cylinder, has ends connected between the first trapezoidal section 95 and the central trapezoidal section (e.g., 395) or sections to raise and lower the first implements section. A secondary actuator, such as a secondary hydraulic cylinder, has ends connected between the second trapezoidal section 195 and the central implement section (e.g., 295) or sections to raise and lower the second trapezoidal section.

As illustrated in FIG. 1 and FIG. 2, the implement 19 has implement wheels 106 and vehicle wheels 104 that are guided between plant rows or seed beds consistent with avoiding or minimizing damage to plants, drip tape or to move in accordance with target boundaries.

FIG. 3 is one embodiment of a block diagram of control system associated with a ground-engaging implement 19 with lateral position adjustment.

The control system comprises vehicle electronics 10 and implement electronics 48. In one embodiment, the vehicle electronics 10 comprises a vehicle data processor 12, vehicle data storage 14, data ports 22, and a vehicle image processing system 24 that can communicate with each other via first data bus 20. In one embodiment, the vehicle image processing system 24 is coupled to a vehicle imaging device 26 that can provide collected image data (e.g., stereo image data) to the vehicle image processing system 24.

The vehicle data processor 12 may comprise a microprocessor, a microcontroller, a programmable logic array, digital signal processor, an application specific integrated circuit, a logic circuit, an arithmetic logic unit, or another electronic data processing unit.

The vehicle data storage 14 device comprises electronic memory, nonvolatile random access memory, an optical storage device, a magnetic storage device, a magnetic hard drive, a magnetic tape, or another device for storing digital data.

In one embodiment, the vehicle data storage 14 device stores one or more of the following modules, such as software modules: vehicle guidance module 16 and implement guidance module 18.

A vehicle location-determining receiver 34 may comprise a satellite navigation receiver, such as a satellite navigation receiver or Global Positioning System (GPS) receiver with differential correction receiver for receiving a differential correction signal from reference stations. The vehicle-location determining receiver 34 may communicate directly with the data port 22 of the vehicle control system 11 or via the vehicle data bus 32. In one embodiment, the vehicle electronics 10 comprises a steering controller 36, a braking controller 38, and a propulsion controller 40 that can communicate via the vehicle data bus 32. In turn, the steering controller 36 is coupled to the steering system 42; the braking controller 38 is coupled to the braking system 44; the propulsion controller 40 is coupled to the propulsion unit 46.

In one embodiment, the steering system 42 comprises an electrohydraulic steering system or electric steering system, where the electrohydraulic steering system comprises a solenoid that controls the valve of a hydraulic steering system and where the electric steering system comprises an electric motor that drives a rack and pinion gear or another mechanical steering linkage. The braking system 44 may comprise an electrohydraulic braking system, a cable braking system, or mechanical braking system. The propulsion unit 46 comprises an engine, an electric motor, or the fuel metering device that is used in conjunction with an internal combustion engine.

In one embodiment, the first communications gateway 30 can communicate to the vehicle data bus 32 and provides security layer between the first wireless device 28 and vehicle data bus 32 or vehicle electronics 10. Further, the first communications gateway 30 provides buffer memory for storing communications between the vehicle electronics 10 and the implement electronics 48.

The implement electronics 48 comprises an implement data processor 50, implement guidance module 18, implement data storage 52, and data ports 56 that can communicate with each other via the second data bus 54. At the implement 19, an optional imaging device 58 is coupled to the data ports 56.

In one embodiment, the first position sensor 68, second position sensor 168, third position sensor 268, and fourth position sensor 368 are coupled to the implement data bus 64 or the data ports 56. Similarly, in one embodiment, the first actuator 80, the second actuator 180, the third actuator 280 and fourth actuator 380 are coupled to the implement data bus 64 or the data ports 56. Each position sensor (68, 168, 268, 368) may comprise a rotary position sensor; a magnet and magnetic field sensor (e.g., Hall-effect sensor); or potentiometer. Each actuator (80, 180, 280, 380) may comprise a hydraulic cylinder, a linear actuator, a linear motor, an electric motor with a screw gear or rack and pinion gear, or the like.

In one embodiment, the first position sensor 68 may comprise an angle sensor, an optical sensor, a magnetic field sensor and an associated magnet, a potentiometer, a rotary potentiometer, or another sensor for measuring an angle 90 between any first pivotable arm (76, 78) and a first front member 75 or first rear member 84 rotatably connected to the first pivotable arm (76, 78). In one embodiment, the second position sensor 168 may comprise an angle sensor, an optical sensor, a magnetic field sensor and an associated magnet, a potentiometer, a rotary potentiometer, or another sensor for measuring an angle 90 between any second pivotable arm (176, 178) and a second front member 175 or second rear member 184 rotatably connected to the second pivotable arm (176, 178).

An implement location-determining receiver 66 may comprise a satellite navigation receiver, such as a satellite receiver with differential correction receiver for receiving a differential correction signal from reference stations. The implement location-determining receiver 66 may communicate directly with the data port 56 of the implement electronics 48 or data processing system or via the implement data bus 64.

In one embodiment, the second communications gateway 62 can communicate to the implement data bus 64 and provides security layer between the second wireless device 60 and second data bus 54 or implement electronics 48. Further, the second communications gateway 62 provides buffer memory for storing communications between the vehicle electronics 10 and the implement electronics 48.

As illustrated in FIG. 4, the first actuator 80 and the second actuator 180 are mounted on opposite sides of the implement longitudinal axis 25. Further, the first actuator 80 and the second actuator 180 are mounted on opposite inner rotatable arms. In one embodiment, first position sensor 68 may comprise a magnet mounted on a rotatable arm and a magnetic field sensor mounted on the front member 73 or the first front support member 75, which is a section of the front member 73; the second position sensor 168 may comprise a magnet mounted on a rotatable arm and a magnetic field sensor mounted on the front member 73 or the second front support member 175, which is a section of the front member 73. The first position sensor 68 and the second position sensor 168 provide sensor signals or sensor data to the data ports 56 or the implement data processor 50 or implement guidance module 18 to estimate or determine a angle 90, which in turn, indicates the lateral offset of the respective row unit or its opener (e.g., nutrient knife 99) with respect to a reference point on the implement or the front member 73.

In one embodiment, optional force sensors 45, such as strain gauges or piezoelectric sensor modules provide force signals or force data to the data ports 56. The force sensors 45 are illustrated in dashed lines to indicate that they are optional and can be deleted in certain configurations. In one configuration, force sensors 45 can be located on a structural member of the row unit (93, 193, 293, 393) that is subject to draft forces or similar sheer stress or tensile stress from the ground-engaging implement to opener (e.g., nutrient knife 99), such as where the row unit is attached to the respective rear member (84, 184, 284, 384). In another configuration the force sensors 45 are located on the frame member 505 (in FIG. 5A through FIG. 5C, inclusive). In an alternate configuration, the force sensors 45 can be associated with a mechanical link between any respective rear member and the frame member 505 or the row unit.

In one embodiment, in a draft force compensation mode an implement data processor 50 or implement guidance module 18 is adapted for (e.g., programmed with software instructions in the data storage 52 to) independently or collectively adjust the first lateral position of a first opener (e.g., nutrient knife 99 and ground-engaging element) of a first row unit (e.g., 93) and the second lateral position and ground-engaging element of a second opener (e.g., nutrient knife 99) of a second row unit (e.g., 193) to balance or equalize the first and second draft forces or to maintain such first and second draft forces in target maximum range of each other, wherein the first opener is located on one side of the implement longitudinal axis and wherein the second opener is located on an opposite side of the implement longitudinal axis 25. In another embodiment, in a draft force compensation mode an implement data processor 50 or implement guidance module 18 is adapted for (e.g., programmed with software instructions in the data storage 52 to) independently or collectively adjust the first lateral position and first vertical position of a first opener (e.g., nutrient knife 99 or ground-engaging element) of a first row unit (e.g., 93) and the second lateral position and second vertical position of a second opener (e.g., nutrient knife 99 or ground-engaging element) of a second row unit (e.g., 193) to balance or equalize the first and second draft forces or to maintain such first and second draft forces in target maximum range of each other, wherein the first opener is located on one side of the implement longitudinal axis and wherein the second opener is located on an opposite side of the implement longitudinal axis 25. The implement data processor 50 or implement guidance module 18 may use any combination or weighting of the observed first draft forces, the second draft forces, and the observed implement angle to minimize or reduce error in tracking the target implement heading at any given corresponding position of the implement.

Accordingly, in a draft force compensation mode or draft force balancing mode, the control system 11, the implement electronics 48, or the implement data processor 50 or implement guidance module 18 is configured to apply equal and opposing forces (e.g. opposite lateral forces of approximately equal magnitude), via the first actuator 80 and the second actuator 180, to respective row units (93, 193), such that the row units can: (1) balance or equalize draft forces (e.g., to fall within a certain maximum range of each other) associated with the ground-engaging elements (e.g., first opener of first row unit 93 and second opener of second row unit 193) of the row units (93, 193), and (2) avoid the implement 19 being misdirected from a target implement path by the differential interaction of the ground-engaging elements from different row units (e.g., on opposite sides of implement longitudinal axis 25) with the ground.

As illustrated in FIG. 4, the third actuator 280 and the fourth actuator 380 are mounted on opposite sides of the implement longitudinal axis 25. Further, the third actuator 280 and the fourth actuator 380 are mounted on opposite inner rotatable arms and associated with optional respective force sensors 45, such as piezoelectric sensor modules that provide force signals or force data to the data ports 56. Accordingly, in a draft force balancing mode, the control system 11, the implement electronics 48, or the implement data processor 50 or implement guidance module 18 is configured to apply equal and opposing forces (e.g. opposite lateral forces of approximately equal magnitude), via the third actuator 280 and the fourth actuator 380, to respective row units (293, 393), such that the row units can balance or equalize draft forces associated with the ground-engaging elements of the row units (293, 393).

FIG. 4 is a plan perspective view of a one embodiment of a ground-engaging implement with lateral position adjustment. As previously indicated, each rear member (84, 184, 284, 384) is spaced apart from the respective front member (75, 175, 275, 375) and positioned generally parallel to the front member. A pair of pivotable arms (76, 78; 176, 178; 276, 268; 376, 378) are generally parallel to each other. The pivotable arms (76, 78; 176, 178; 276, 268; 376, 378) are rotatably connected a front member (75, 175, 275, 375) at two front pivot points (82, 182, 282, 382). The pivotable arms are rotatably connected to the rear member at two rear pivot points (85, 185, 285, 385). At least one first opener (e.g., 99) extends downward from or with respect to the each rear member or its row unit (93, 193, 293, 393).

In one embodiment, the pivotable arms are rotatably connected to the front member 73 via brackets 86, 186, 286. Similarly, the pivotable arms are rotatably connected to the rear members 77 via brackets 86, 186, 286. In one configuration, each row unit (93, 193, 293, 393) is connected to the rear members 77 via fasteners or attachment mechanism 189.

Each actuator (80, 180, 280, 380) has a first end (87, 187, 287, 387) and a second end (88, 188, 288, 388) opposite the first end. The first end is coupled to one of the pivotable arms (76, 78; 176, 178; 276, 278). The second end is coupled to the front member 75 to adjust the lateral position of the opener or each rear member 73 with respect to its corresponding first front member 75. A position sensor (68, 168, 268, 368) is arranged to estimate a lateral position of the first opener or the first rear member with respect to the front member 75. For example, the position sensor can estimate the lateral position based on an angle between any pivotable arm and the front member 73 or the rear member 77.

FIG. 5A through FIG. 5D, inclusive, represent illustrative, alternate examples of row units (493, 593, 693 or 793) that may be used to replace row units (93, 193, 293, 393) in any configurations of the implement 19. Any of the row units may be coupled to the rear member 77 of the implement, such as the first rear member 84, the second rear member 184, the third rear member 284 or the fourth rear member 384, via a fastener and mounting plate (47, 147) or another mounting mechanism.

Figure 5A:
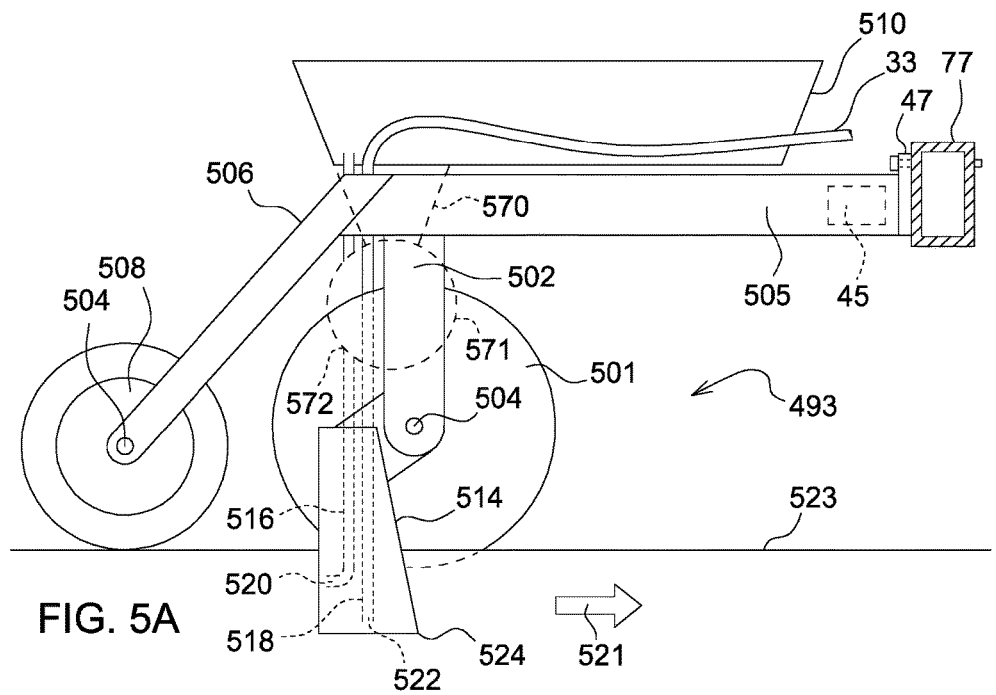
FIG. 5A is a side view of a first configuration of a row unit or ground-engaging assembly for mounting on the implement.

FIG. 5A is a side view of a first configuration of a row unit 493 or ground-engaging assembly for mounting on any rear member 77 of the implement 19. The row unit 493 comprises a generally horizontal frame member 505 with a first support 502 and a second support 506 connected to or integral with the frame member 505. The first support 502 and the second support 506 extend downward from the frame member 505. The opener 501 is supported by or from the first support 502. In one embodiment, an opener 501 (e.g., disc-shaped opener or coulter) is rotatable with respect the first support 502; the opener 501 may be mounted to the first support 402 via radial bearing or shaft 504 at a hub of the opener 501. However, in an alternate embodiment the opener 501 may be fixed or non-rotating with respect to the first support 502.

In one configuration, the opener 501 may comprise a leading coulter a nutrient knife 514 that tracks or follows a path of the leading coulter, and where the nutrient knife and the leading coulter are laterally aligned. In one embodiment, a knife 514 or sharp, pointed member may be connected to or extend from the first support 502. As illustrated the knife 514 has a pointed leading edge 524 for forming or carving a groove in the soil or ground 523.

In one embodiment, the knife 514 may comprise a nutrient knife with a first passageway, first conduit, or first tube 518 that terminates a first outlet 522 (e.g., treatment opening) for directing nitrogen, ammonia or other nutrient into the soil that the knife 514 can displace after the opener. From tank 102, the tube 33 is connected to the first tube 518 for delivery of nutrients, nitrogen, fertilizer or other crop input from the tank 102, a pump 27, manifold (29, 31) or pressure regulator.

In one embodiment, the knife 514 may have a second passageway, conduit or tube 516 that terminates in a second outlet 520 for seed deposition into the soil 523 within or spaced apart from the groove by a vertical separation, or both a vertical and horizontal separation between the first outlet 522 and the second outlet 520. In other embodiments, the first outlet 522 and the second outlet 520 have one or more of the following separations: a lateral separation, a vertical separation and longitudinal separation, wherein seed and nutrients may be applied simultaneously to the soil consistent with the separations. For example, as illustrated, the first outlet 522 and the second outlet 520 have a substantially vertical separation, where the fertilizer, nitrogen or nutrient is placed below planted seed. In any of the row units (493, 593, 693) of FIG. 5A, FIG. 5B and FIG. 5D, the first outlet 522 can be located on one side of the first opener 501 and the second outlet 520 is located on an opposite side of the first opener 501, such that there is lateral separation between the planted seed and applied nutrients. However, nothing prevents the use of vertical separation alone for the row units (493, 593) of FIG. 5A and FIG. 5B, with respect to the vertical separation between the first outlet 522 and the second outlet 520.

In some configurations where simultaneous planting of seed and fertilizing of strips of soil is carried out, each row unit (493, 593, 693, 793) may comprise a seeding unit, where the seeding unit arranged to drop, places or insert one or more seeds into an opening formed by one or more openers (e.g., opener 501, the opener 526, or both) and one or more nutrient knives 514; one or more rollers or firming wheels 508 follow the seeding unit to close or cover the seed one or more seeds with soil. For example, a seed hopper 510 for the row unit 493 is capable of supplying seed (e.g., by gravity) to an inlet port 570 of a seed metering device 571 between the seed hopper 510 and the second outlet 520. The seed metering device 571 receives bulk seeds at the inlet port 570 and outputs seed at the outlet port 572 at a controlled rate of one seed per unit time based on the speed of travel of the implement 19 through the field during planting. The outlet port 572 of the seed metering device 571 is connected to the second tube 516 that terminates in the second outlet 520 for the seed. In one configuration, the seed metering device 571 may comprise a rotatable metering disc with radially spaced seed cavities that are loaded with seed from the hopper 510 by gravity or pneumatic pressure, where the seed metering device 571 meters or releases seed in a controlled manner at a given rate (e.g., or target seed density based on the rotational speed of the metering disc that is proportional to the velocity of the implement 19) from outlet port 572 as the metering disc is rotated by an actuator or coupled to a ground engaging wheel or the opener 501.

In one embodiment, a firming wheel 508 or closer is rotatable with respect to the second support 506; the firming wheel 508 may be mounted on the second support 506 via a radial bearing or shaft 504 at its hub. The firming wheel 508 closes, compresses or compacts the soil 523 after it is disrupted by the opener 502 and knife 514 to capture or confine the applied nitrogen, ammonia or nutrient and to cover the planted seed by soil 523. For example, the covered soil 523 can prevent ammonia from escaping to or evaporating into the ambient air. The press wheel or firming wheel 508 may comprise one or more wheels with annular cross sections that are substantially concave at the wheel-soil interface, convex at the wheel-soil interface, or cylindrical at the wheel-soil interface, or rectilinear at the wheel-soil interface. The row unit 493 or ground engaging assembly of FIG. 5A can be mounted on the implement 19 illustrated in FIG. 4, for example. The direction of travel of the row unit 493 is indicated by arrow 521.

Figure 5B:
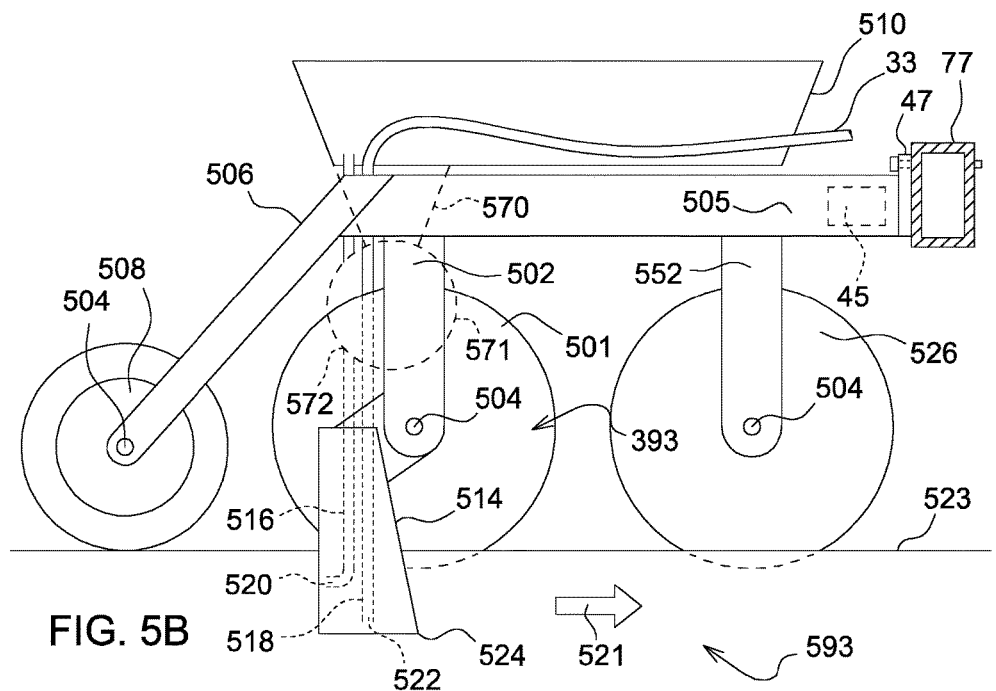
FIG. 5B is a side view of a second configuration of a row unit or ground-engaging assembly for mounting on the implement.

FIG. 5B is a side view of a first configuration of another embodiment of row unit 593 ground-engaging assembly for mounting on the implement 19. Like reference numbers in FIG. 5A and FIG. 5B indicate like elements. The row unit 593 or ground engaging assembly of FIG. 5B is similar to the row unit 493 of FIG. 5A, except the row unit 593 of FIG. 5B further comprises a leading opener 526 or coulter in front of the opener 501. The leading opener 526 is spaced apart from the opener 501 in the direction of travel of the implement 19. A third support member 552 or supplemental support extends downward from the frame member 505. In one embodiment, the leading opener 526 comprises a coulter (e.g., disc-shaped opener) that is rotatable with respect the third support 552; the leading opener 526 may be mounted to the third support 552 via radial bearing or shaft 504 at a hub of the leading opener 526. The leading opener 526 can more efficiently cut through crop residue and open heavier clay or damp soil than use of only opener 501.

In one embodiment, the leading opener 526, the opener 501 and the nutrient knife 514 are laterally aligned, such that the nutrient knife tracks or follows a generally linear or curved path through the soil of the leading opener 526 and the opener 501.

In FIG. 5B, the first tube 518 has a first outlet 522 for nutrients, fertilizer or other crop outputs, whereas the second tube 516 has a second outlet 520 for seed or coated seed, where the first outlet 522 and the second outlet 520 may be on same or the opposite lateral sides of the opener 501, or where the first outlet 522 and the second outlet may be spaced apart vertically, laterally or both to avoid burning or damage to coated or uncoated seed by a fertilizer or ammonia. If the is seed coated with a water soluble polymeric, fungicidal, anti-corrosive buffering barrier, or other coating that protects the coated seed from burning (e.g. from salts or corrosive compounds associated with or in fertilizer), closer separation of the first outlet 522 and the second outlet 420 is supported.

For example, the first outlet 522 of the first tube 518 may be placed below the second outlet 520 of the second tube 516, such that the nutrient knife embeds or traps the nutrient or ammonia in the soil beneath the planted seed. However, in come embodiments, the second outlet 520 and associated second tube 516 of FIG. 5B are eliminated to allow simultaneous planting and fertilizing of the seed to save fuel. Here, the control system 11 of FIG. 3 in conjunction with the separately adjustable lateral offset of each trapezoidal section of implement 19 can be used to plant the rows of seed with fertilizer in a single efficient pass through the field, and in alignment with buried trip tape, buried or surface irrigation lines, or in alignment with reference lines, reference contours, or reference curves near waterways, natural features, hillsides, obstacles or otherwise.

In one embodiment, the control system 11 can adjust independently and separately the lateral position of different row units on opposite sides of the implement longitudinal axis 25 to balance or equalize the draft forces associated with the different row units of the implements on opposite sides of the implement longitudinal axis 25 to allow the implement 19 to traverse through the field in true alignment with a desired target path. For example, the actuators (80, 180, 280, 380) on opposite sides of the implement longitudinal axis 25 may be configured to apply equal and opposing forces to the row units, such that the row units can balance or equalize draft forces associated with the ground-engaging elements, such as one or more of the leading opener 526, the opener 501, the knife 514 or the closing wheel 508 or closer.

Figure 5C:
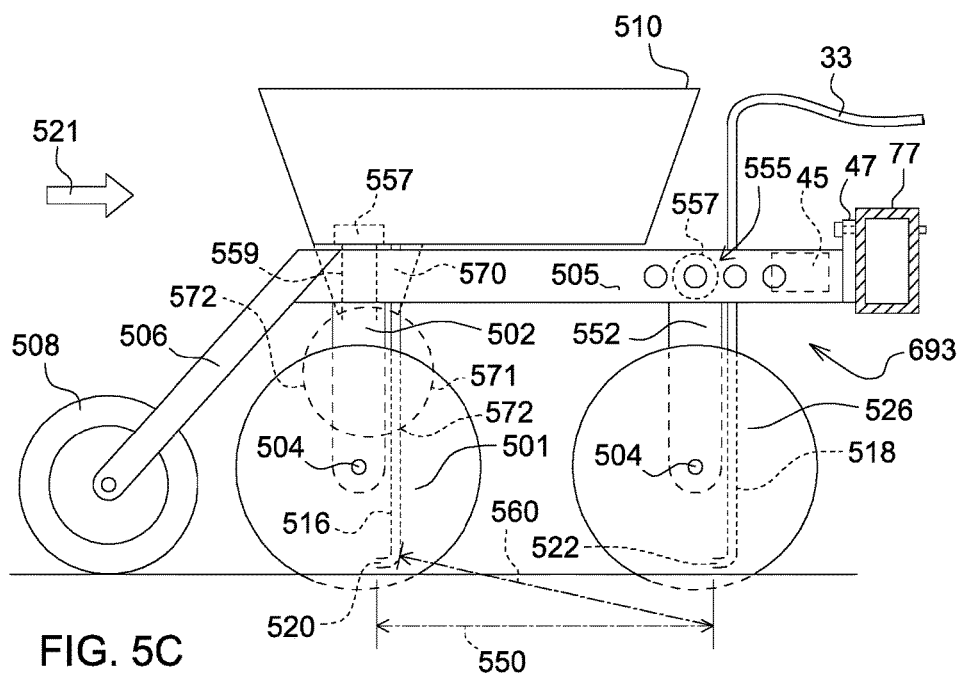
FIG. 5C is a side view of a third configuration of a row unit or ground-engaging assembly for mounting on the implement.

FIG. 5C is a side view of a first configuration of a ground-engaging assembly or row unit 693 for mounting on the implement 19. Like reference numbers in FIG. 5B and FIG. 5C indicate like elements. The row unit 693 of FIG. 5C is similar to the row unit 593 of FIG. 5B, except the seeding and the fertilizer placement and/or opening are performed by separate openers (501, 526) that are: (1) laterally spaced from each other with a fixed lateral spacing 560 or an adjustable lateral spacing that is adjustable manually by a series of mounting holes or by an actuator (e.g., linear actuator or electrohydraulic actuator); and (2) longitudinally spaced each other with a fixed longitudinal spacing 550 or an adjustable longitudinal spacing that is adjustable manually or by an actuator (e.g., linear actuator or electrohydraulic actuator), where the lateral spacing 560 is substantially perpendicular to the implement longitudinal axis 25 and where the longitudinal spacing 550 is substantially parallel to the implement longitudinal axis 25.

In FIG. 5C, the first outlet 522 is associated with the first opener 526 or leading opener; second opener 501 or trailing opener is associated with the second outlet 520 with a longitudinal separation between the first outlet 522 and the second outlet 520 to achieve a target lateral separation and target longitudinal separation between the a strip of applied nutrient and planted seed.

In one embodiment, the lateral spacing or separation between the first outlet and the second outlet can be adjusted manually by a series of holes extending vertically through a transverse support member 559 for receiving a fastener 557 to extend through a corresponding bore in the frame member 505 affix the alignment of the transverse support member 559 and the frame member 505; hence, adjust the lateral spacing 560 between the applied crop input (e.g., nitrogen) and planted seed. Similarly, in one embodiment, the longitudinal spacing or separation between the first outlet and the second outlet can be adjusted manually by a series of mounting holes 555 and a fastener 557 inserted through one of the mounting holes 555; hence, adjust the longitudinal spacing 550 between the crop input (e.g., nitrogen) and planted seed.

If the leading opener 526 is associated with dispensing nitrogen or chemical crop inputs, the trailing opener 501 is associated with dispensing seeds, and vice versa. A wide firming wheel 508 or a set of firming wheels tracks behind the openers (501, 526). The leading opener 526, the trailing opener 501 and the firming wheel 508 or rotatably mounted to the frame member 505 with respect to respective supports (502, 552), or adjustable supports, that extend downward from the frame member 505. An optional nutrient knife can be associated with one or both openers that dispenses crop input or seeds into the ground 523.

If the lateral spacing 560 or separation between the openers of FIG. 5C is fixed, the control system 11 of FIG. 3 in conjunction with the lateral offset can be used to plant the rows of seed in alignment with buried trip tape, buried or surface irrigation lines, or in alignment with reference lines, reference contours, or reference curves near waterways, natural features, hillsides, obstacles or otherwise.

If the lateral spacing 560 or separation between the openers of FIG. 5C, or rather the lateral separation between the first outlet 522 and the second outlet 520, is adjustable, the lateral separation can be changed with seed planted density, change in crop variety, or change in soil characteristics versus field position, for example. FIG. 5C supports fuel saving by the simultaneous application of seeds and fertilizer.

Figure 5D:
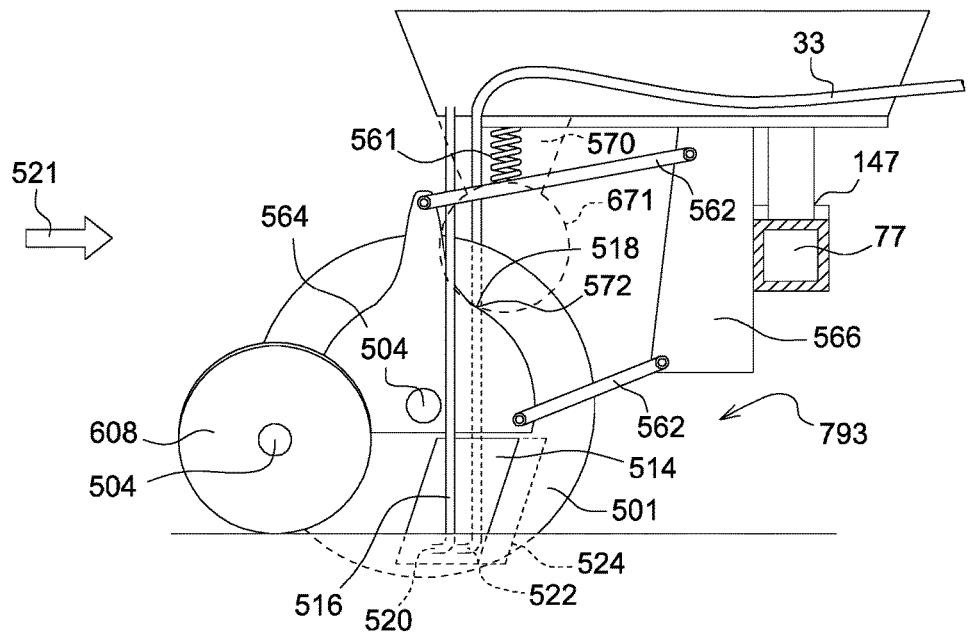
FIG. 5D is a side view of a fourth configuration of a row unit or ground-engaging assembly for mounting on the implement.

FIG. 5D is a side view of a first configuration of a row unit 793 or ground-engaging assembly for mounting on the implement 19. Like elements in FIG. 5A through FIG. 5D indicate like elements.

FIG. 5D features a single opener 501 is used with one or more knives 514, such as one nutrient knife or blade on each lateral side of the single opener 501. Further, the first outlet 522 for seed and the second outlet 522 for nutrients are on the opposite lateral sides of the opener 501. The configuration of FIG. 5D may provide some lateral separation between the seed and fertilizer, such that additional vertical separation between the first outlet 520 for seed and the second outlet 522 for the fertilizer is used to prevent burning or damage to the seed, rather than reduction of fertilizer concentration.

A trailing closer 608 may comprise a single closing wheel or dual closing wheels, with or without notches in their circumference, for following the planted seed to compact and close the soil over the seed and fertilizer.

The row unit 793 features a linkage members 562 that are connected to the stationary hub structure at one end and bracket 566 at an opposite end, which is connected to the rear member 77. The linkage member 562 is associate with a suspension spring 561 that places downward force on the knife 514 and opener 501, but that allows upward travel for forces that exceed a threshold level proportional to the spring constant of the suspension spring 561.

Figure 5E:
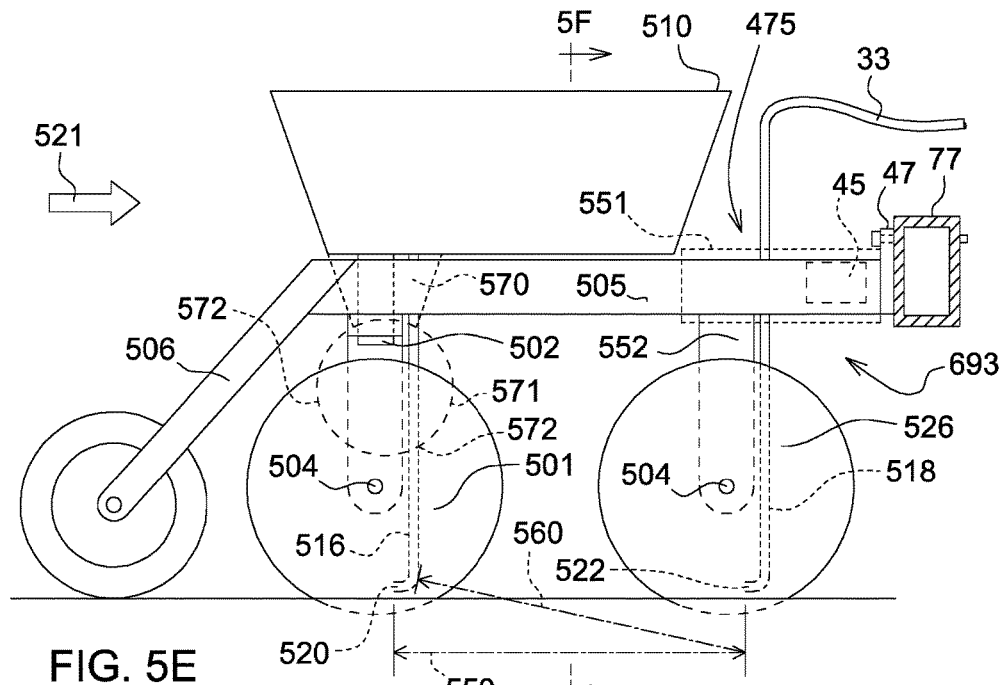
FIG. 5E is a side view of a fourth configuration of a row unit or ground-engaging assembly for mounting on the implement.

FIG. 5E is a side view of a fourth configuration of a row unit or ground-engaging assembly for mounting on the implement. The row unit of FIG. 5E is similar to the row unit of FIG. 5C, except the mounting holes 555 and fastener 557 are omitted and row frame 551 is secured to rear member 77 via one or more fasteners 47 to support a laterally adjustable row assembly 475 as illustrated in FIG. 5F.

Figure 5F:
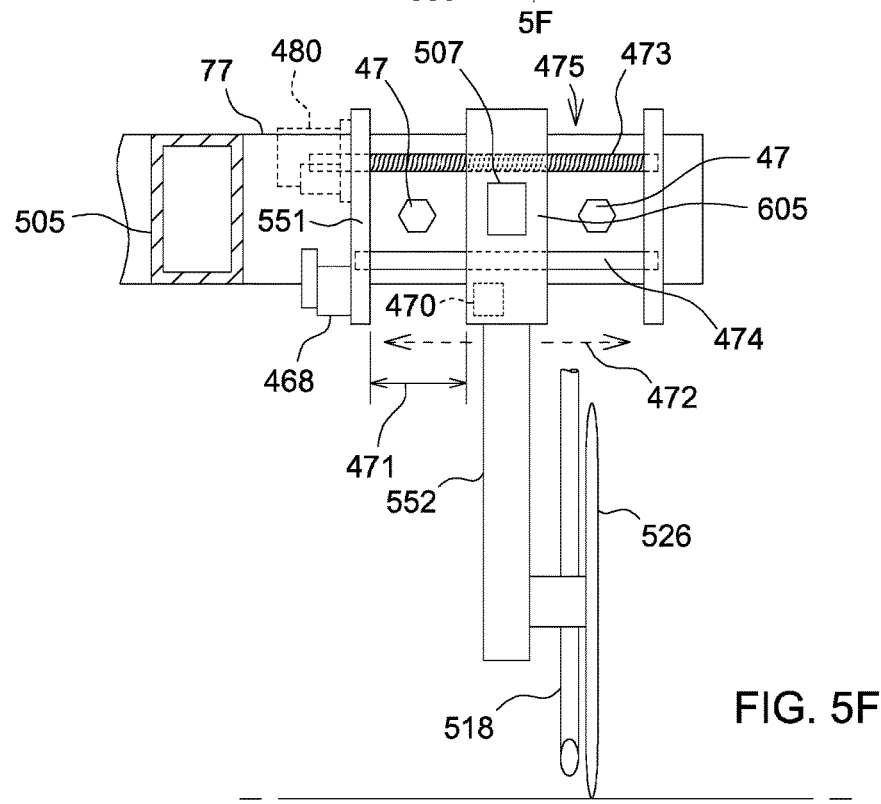
FIG. 5F shows the fourth configuration of the row unit or ground-engaging assembly along reference line 5F-5F of FIG. 5E.

FIG. 5F shows the fourth configuration of the row unit or ground-engaging assembly along reference line 5F-5F of FIG. 5E, where the row unit has a laterally adjustable row assembly 475 for adjusting the relative lateral spacing 560 between seed and nutrient application on a dynamic or variable basis as the implement traverses a field. As illustrated in FIG. 5E and FIG. 5F, the row frame 551 is secured or connected to a corresponding rear member 77. For example, the row frame 551 is connected to the corresponding rear member 77 via one or more fasteners 47, where the row frame 551 member is generally U-shaped or has two orthogonally extending portions as viewed from above.

In one embodiment, a movable carrier 605 has an adjustable lateral position 471 that is adjustable along a lateral adjustment range 472 associated with an opening in the row frame 551 member. The carrier 605 is supported by a drive member 473 and a guide 474, where the carrier 605 engages the drive member 473 and the guide 474 to support lateral movement of the carrier 605 along the drive member 473 and guide 474. For example, the drive member 473 may comprise a threaded rod or a rack gear that is driven by a row lateral position actuator 480, such as linear motor or electric motor. In one configuration, the carrier 605 has internal threads for interfacing with the threaded rod, whereas in an alternate configuration the carrier has a fixed pinion gear for interfacing with the respective rack gear. The guide 474 may comprise a rod or a bar that interfaces with radial bearings on the carrier 605 to provide stability for the carrier 605 and associated ground-engaging structure (e.g., opener 526) that are mounted to the carrier 605, or that extend downward from the carrier by support 552. As illustrated, the carrier 605 has a hollow core 507.

The row lateral position actuator 480 is responsive to control signals from an implement guidance module 18, implement data processor 50, or vehicle data processor 12 to control the lateral position 471 of the first outlet 522 of the first tube 518 or associated nutrient knife for application or placement of nutrient or other crop input with a defined lateral spacing 560 (e.g., dynamically adjustable) with respect to corresponding seed in the row or planted in an adjacent row. In one example, the row lateral position actuator 480 can dynamically adjust the lateral spacing 560 as the implement progresses or traverses a field or zone within the field based on a position of the implement provided by an implement location-determining receiver 66, or a vehicle location-determining receiver 34.

Figure 8:
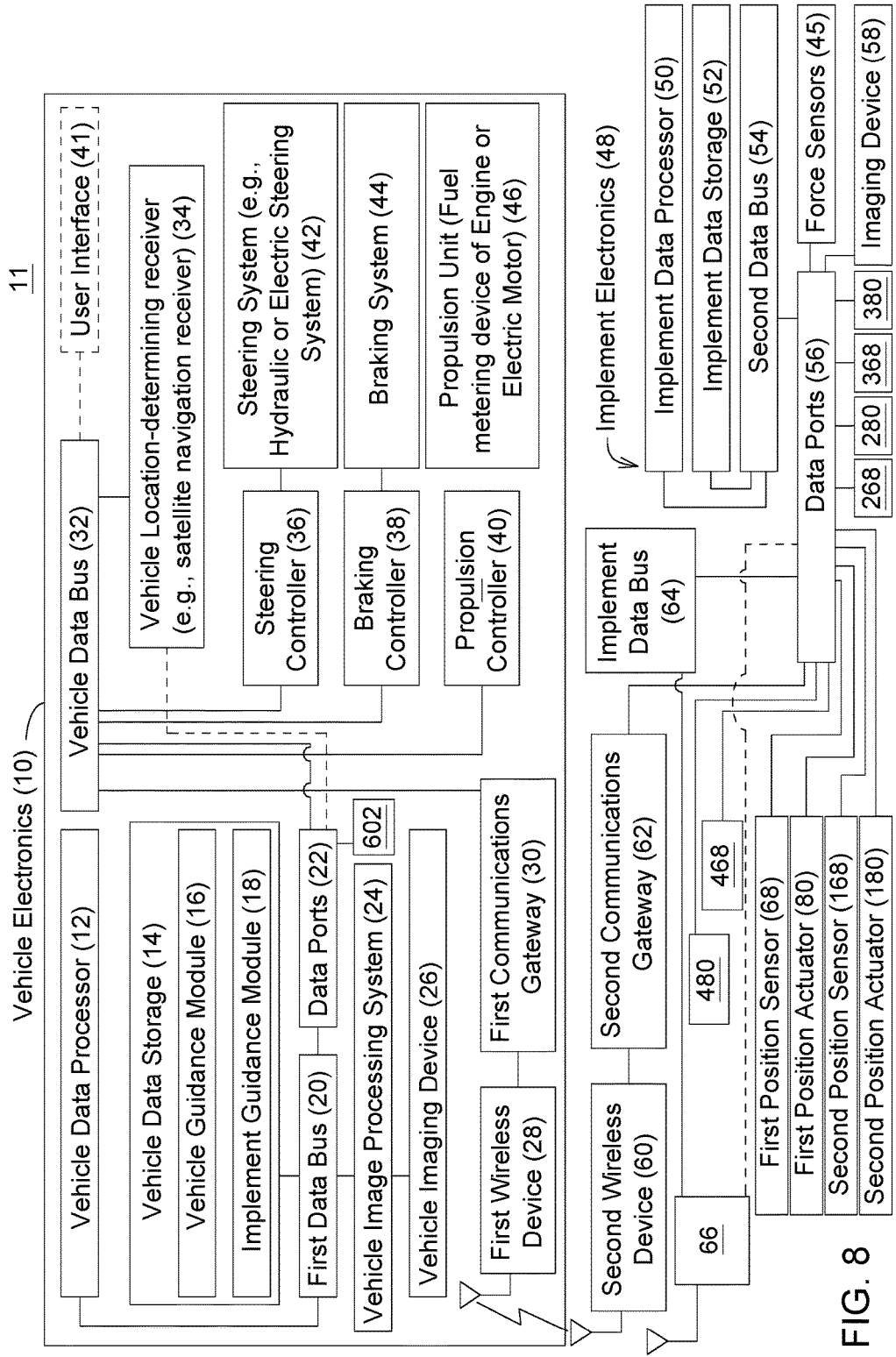
FIG. 8 is one embodiment of a block diagram of control system (e.g., electronics and vehicle software) associated with a ground-engaging implement with position adjustment of one or more lateral rows.

In one embodiment, a row lateral position sensor 468 provides an observed or measured lateral position of the carrier 605 or its ground engaging element (e.g., opener 526) with respect to a referenced point of fixed point on the implement, such as a reference point on the rear member 77. As illustrated, the lateral position sensor 468 may comprise a magnetic 470 field sensor for sensing a magnetic field associated with a magnet 470 mounted in or on the carrier 605 to estimate the lateral position of the carrier 605. In an alternate embodiment, the row lateral position sensor 468 may comprise a position encoder or rotor position encoder that is integral with or associated with the row lateral position actuator 480. Although FIG. 8 shows a single lateral position sensor 468 and a corresponding lateral position actuator 480 for one row unit, in practice a variation of FIG. 8 can include multiple lateral row position sensors 468 and corresponding lateral position sensors 468 coupled to data ports 56, where there is one lateral row position sensor 468 and a corresponding lateral position sensor 468 for each row unit that is independently or separately laterally adjustable.

In one embodiment, the lateral position actuator 480 of the laterally adjustable row assembly 475 are used, alone or cumulatively, in conjunction with the ganged lateral adjustment of multiple rows via the position actuators (80, 180, 280, 380), where any individual, separate or cumulative lateral adjustments can consider lateral spacing between applied nutrient strip and corresponding seeds (or seed density) of each row, and/or draft compensation to achieve targeted guidance lines or contours (e.g., even during higher speed planting, such as greater than approximately 5-7 miles per hour).

In an alternate embodiment, a set of laterally adjustable row assemblies 475 may be connected to rear member 77, where rear member 77 is directly connected to a hitch 61; front member 75 is deleted, pairs of pivotable arms (76, 78, 176, 178, 276, 278, 376, 378) are deleted, and position actuators (80, 180, 280, 380) are deleted such that the only lateral row adjustment is provided by a lateral position actuator 480 of the laterally adjustable row assembly 475 at the row level.

Figure 5G:
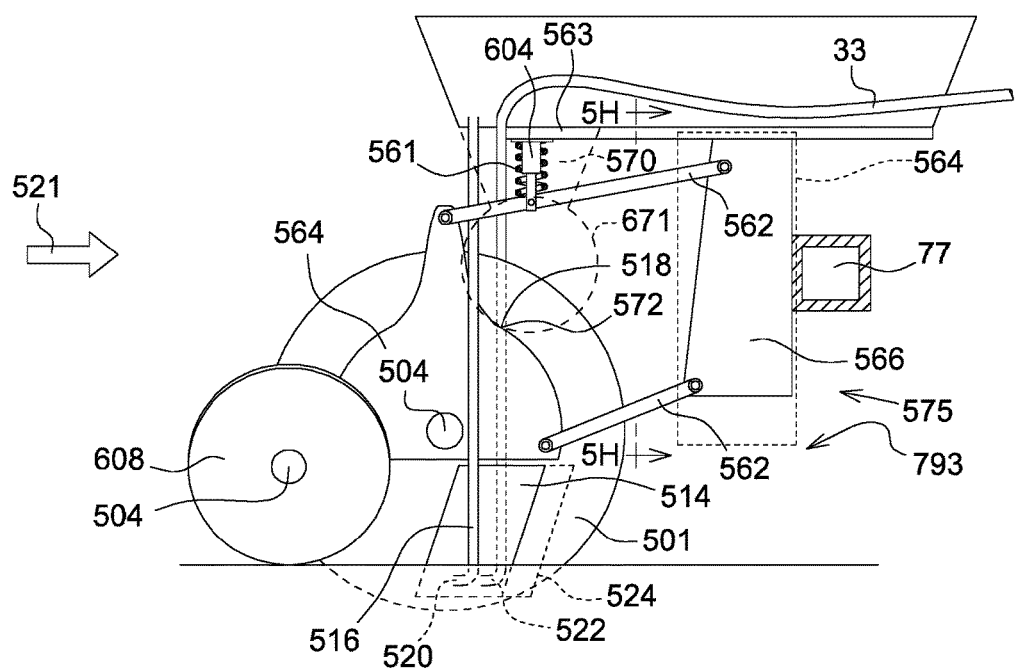
FIG. 5G is a side view of a fifth configuration of a row unit or ground-engaging assembly for mounting on the implement.
Figure 5H:
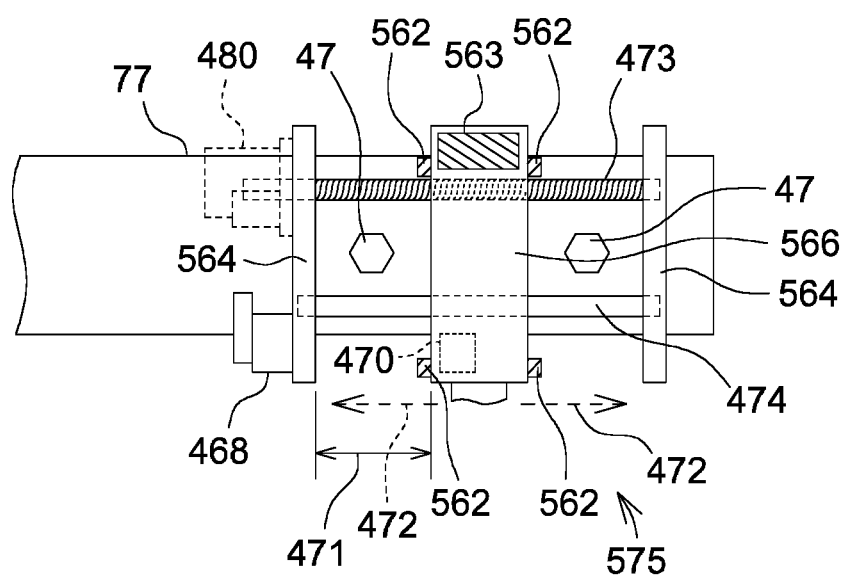
FIG. 5H is a side view of a fifth configuration of a row unit or ground-engaging assembly as viewed along reference line 5H-5H of FIG. 5G.

FIG. 5G is a side view of a fifth configuration of a row unit or ground-engaging assembly for mounting on the implement. The row unit of FIG. 5G is similar to the row unit of FIG. 5D, except that the row unit of FIG. 5G further includes a downforce actuator 604 and laterally adjustable row unit 575. FIG. 5H is a side view of a fifth configuration of a row unit or ground-engaging assembly as viewed along reference line 5H-5H of FIG. 5G.

FIG. 5G and FIG. 5H collectively illustrate a laterally adjustable row assembly 575 for adjusting (e.g., dynamically adjusting) the relative lateral spacing between adjacent rows with fixed intra-row lateral spacing between the seed and nutrient application as the implement traverses a field. The laterally adjustable row assembly 575 has a fixed intra-row lateral spacing between the first outlet 522 (for nutrient) and the second outlet 520 (for seed), although the associated opener 501 and nutrient knife 514 or cutter may support a vertical separation (e.g., fixed or variable) between the applied nutrient and dispensed seed.

If the implement has at least two adjustable row assemblies 575 for adjacent rows, the spatial separation of seeds between adjacent rows can be changed, the spatial separation of nutrients between adjacent rows can be changed, or both (e.g., to support variable seed density or different nutrient treatment zones within a field, where nutrient spacing to the seed can be varied in accordance with soil properties, local ground elevation or ground slope, growing environment, or otherwise). The row frame 564 is secured or connected to a corresponding rear member 77. For example, the row frame 564 is connected to the corresponding rear member 77 via one or more fasteners 47, where the row frame 564 member is generally U-shaped or has two orthogonally extending portions as viewed from above.

In one embodiment, a movable carrier 566 has an adjustable lateral position 471 that is adjustable along a lateral adjustment range 472 associated with an opening in the row frame 564 member. The carrier 566 is supported by a drive member 473 and a guide 474, where the carrier 566 engages the drive member 473 and the guide 474 to support lateral movement of the carrier 566 along the drive member 473 and guide 474. For example, the drive member 473 may comprise a threaded rod or a rack gear that is driven by a row lateral position actuator 480, such as linear motor or electric motor. In one configuration, the carrier 566 has internal threads for interfacing with the threaded rod, whereas in an alternate configuration the carrier has a fixed pinion gear for interfacing with the respective rack gear. The guide 474 may comprise a rod or a bar that interfaces with radial bearings on the carrier 566 to provide stability for the carrier 566 and associated ground-engaging structure (e.g., opener 526) that are mounted to the carrier 566, or that extend downward from the carrier by support 552. In one embodiment, the carrier 566 has a hollow core.

The row lateral position actuator 480 is responsive to control signals from an implement guidance module 18, implement data processor 50, or vehicle data processor 12 to control the lateral position 471 of a first row with respect to a second row, where the first row and the second row are adjacent to each other and where within each row the dispensed seeds and the applied nutrient or crop input have a fixed lateral separation, or the combination of a fixed lateral and vertical separation. In one example, the row lateral position actuator 480 can dynamically adjust the lateral separation between adjacent rows as the implement progresses or traverses a field or zone within the field based on a position of the implement provided by an implement location-determining receiver 66, or a vehicle location-determining receiver 34.

In one embodiment, a row lateral position sensor 468 provides an observed or measured lateral position of the carrier 566 or its ground engaging element (e.g., opener 526) with respect to a referenced point of fixed point on the implement, such as a reference point on the rear member 77. As illustrated, the lateral position sensor 468 may comprise a magnetic field sensor for sensing a magnetic field associated with a magnet 470 mounted in or on the carrier 566 to estimate the lateral position of the carrier 566. In an alternate embodiment, the row lateral position sensor 468 may comprise a position encoder or rotor position encoder that is integral with or associated with the row lateral position actuator 480.

As illustrated in FIG. 5G, the downforce actuator 604 may be coaxially mounted within a coil spring 561 between linkage member 562 and horizontal support 563. To increase the downforce on the ground engaging row unit, to increase the vertical depth of the ground-engaging element (e.g., opener) with respect to the ground or soil level, to increase the planting depth of the seeds, to increase the nutrient depth of the nutrient or other crop input, the downforce actuator 604 extends the length of its shaft. Conversely, to decrease the downforce, to decrease the vertical depth of the ground-engaging element with respect to the ground or soil level, to decrease the planting depth of the seeds, and to decrease the nutrient depth of the nutrient or other crop input, the downforce actuator 561 contracts or reduces the extended length of its shaft. In one embodiment, the downforce actuator 561 comprise a linear actuator, a hydraulic cylinder, a pneumatic cylinder, or an electric motor with an associated screw gear assembly. The vehicle data processor 12, the implement data processor 50, or both may provide control signals to the downforce actuator to dynamically adjust the downforce or vertical position of the ground-engaging elements of one or more row units based on any of the following: (1) an implement position of the implement estimated by an implement location-determining receiver 66, (2) an implement position estimated by a vehicle position of a vehicle location-determining receiver 34 and an a model (e.g., kinematic model) of possible implement movement and location estimated by a data processor (12, 50), (3) sensor data from draft force sensors 45, hitch angle sensors 602, or the like. FIG. 6 is a plan view of a one embodiment of a ground-engaging implement 19 with lateral position adjustment. The implement 19 of FIG. 6 is similar to the implement 19 of FIG. 4. Like reference numbers in FIG. 4 and FIG. 6 indicate like elements or features. In any embodiment disclosed in this document, the implement 19 may have a different number of row units or ground-engaging assemblies per section of the implement 19, or may support a wider swath width of the implement 19 than illustrated in any of the drawings; such variations in the number of row units or swath width shall fall within the scope of the appended claims.

Figure 7:
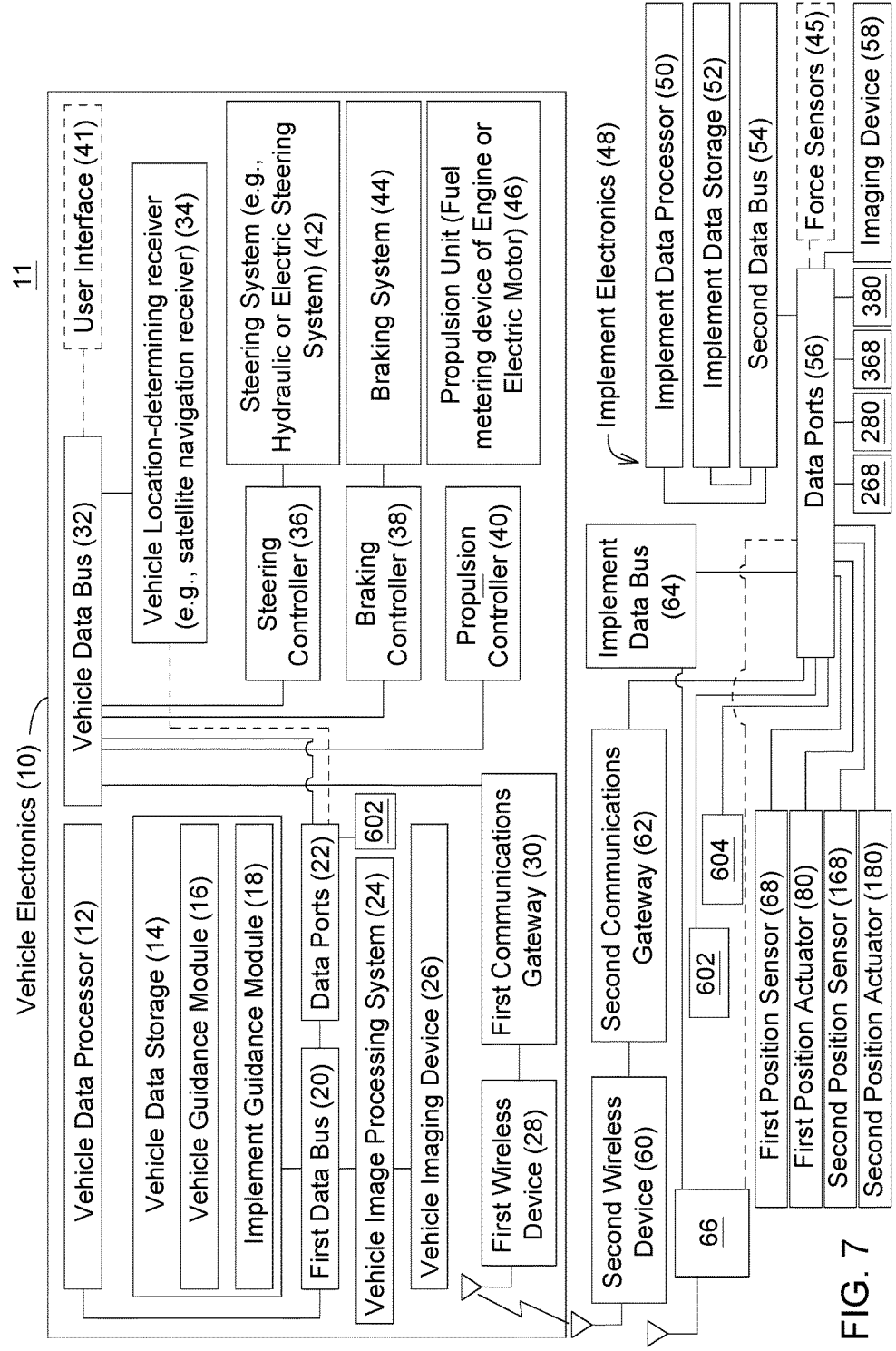
FIG. 7 is one embodiment of a block diagram of control system (e.g., electronics and vehicle software) associated with a ground-engaging implement with draft position adjustment.

FIG. 7 is one embodiment of a block diagram of control system (e.g., electronics and vehicle software) associated with a ground-engaging implement with draft position (e.g., vertical downforce on a row-by row basis and/or lateral position adjustment) adjustment.

The control system of FIG. 7 is similar to the control system of FIG. 3, except the system of FIG. 7 further comprises an angle sensor or magnetic field sensor 602 and one or more downforce actuators 604 associated with one or more corresponding row units (e.g., in FIG. 5G). Further, in FIG. 7 the force sensors 45 are shown in dashed lines to indicate that the force sensors are optional.

In one embodiment, the implement guidance module 18, the implement data processor 50, the vehicle data processor 12, or any combination of the foregoing module and data processors, determine whether draft force on the implement is laterally unbalanced or is misaligning an implement path from a target implement heading that is required to achieve target or planned spacing of plant rows for seeds, crop inputs or both. In one embodiment, the magnetic field sensor 602 (in FIG. 1 and FIG. 7), one or more force sensors 45, or both measure the observed implement angle. In another embodiment, the implement location-determining receiver can estimate the observed implement angle and respective implement position, such that a target implement heading can be retrieved from a look-up table or other data structure in the data storage device (14, 52).

The vehicle electronics 10, the implement electronics 48 or both determine whether the observed implement angle is greater than a threshold deviation from a target implement heading, which is generally correlated to the vehicle heading for a given sampling interval. In other words, the vehicle electronics 10, the implement electronics 48, or both, first, determine an error that is a difference between the observed implement angle and the target implement heading and, second, determines whether the error exceeds the threshold deviation indicative of an unbalanced draft force on the implement.

In one embodiment, the target implement heading is determined by a path plan of the vehicle to achieve a proper as-planted seed bed of seed rows that is planted in accordance with pattern or plan, which may be determined by any of the following: (1) a survey or map of the field, its boundaries, headlands, water features, hazards, and keep-out zones, (2) an area coverage plan such that the implement covers a field with adjacent parallel paths or swaths in substantially linear rows, curved rows, contour rows and/or spiral rows, (3) user input from the operator or an agronomist. The vehicle-location determining receiver 34 and the implement location-determining receiver 66 determines the vehicle position, the implement position, or both (e.g., in two or three dimensional coordinates) to track the target implement heading and path plan stored in the data storage device (14, 52). The data storage device (14, 52) may store a target implement heading, a target vehicle heading, or both for one or more corresponding points (e.g., positions or coordinates) along the path plan. In one embodiment, an implement data processor 50 is adapted to retrieve the target implement heading from an implement data storage device 52 associated with the respective position.

If the observed implement angle is greater than the threshold deviation, the vehicle data processor 12, the implement data processor 50, the implement guidance module 18, or a draft compensation system can steer the implement back toward a target implement heading by one or more of the following: (1) actuating one or more actuators (80, 180, 280, 380) on one lateral side (e.g., left side or right side) of the implement differently (e.g., relative movement or displacement between the actuators on opposite sides) than the other side to reduce or minimize the error (e.g., difference between the observed implement angle and the target implement heading), and/or (2) reducing the downforce or downward pressure (normal to the ground or Earth) on one or more row units or their associated ground-engaging elements (e.g., disc, coulter, opener or nutrient knife) on one lateral side of the implement with respect to the other ground-engaging elements (e.g., opposite ground-engaging elements) on the opposite lateral side of the implement, such as by sending a signal to downforce actuator 604 in FIG. 5G, to reduce or minimize the error (e.g., difference between the observed implement angle and the target implement heading). In one example, if an actuator (80, 180, 280, 380) moves a ground engaging element laterally outward (e.g., rightward on right side of the implement of the implement facing in a forward direction of implement travel) on one side of the implement, the implement is steered with lateral draft compensation to turn an implement front (e.g., leftward) toward the opposite side of the implement; vice versa. In another example, the downforce actuator 604 places differential pressure on row units one lateral side of the implement with respect to row units on an opposite side of the implement, where the row units with the greater downforce pressure into the soil result in the implement slowing on the side with the greater downforce pressure to pull the front of the implement toward the side with the greater downforce pressure; vice versa.

Accordingly, the implement guidance module 18, the vehicle data processor 12 and the implement data processor 50, separately or collectively, can control the actuators (80, 180, 280, 380) and the downforce actuators (604) associated with different row units to equalize substantially the draft force on opposite lateral sides of the implement and to maintain a target implement guidance path (e.g., with straight rectilinear rows, curved rows, spiral rows, parallel rows, parallel implement swaths, or otherwise). However, increasing the downforce by downforce actuators (604) may temporarily increase seed depth of planted seeds or nutrient depth of placed nutrient during a time interval that draft correction is applied, or one or more rows may be lateral shifted during the time interval that draft correction is applied, such that the vehicle guidance module 15, the vehicle data processor 12 or the implement data processor 50 may place limits (e.g., user-definable or factory default settings) on the draft compensation, the maximum downforce or the maximum lateral shift of one or more rows for draft compensation (e.g., such that the planted seeds germinate and grow properly for reliable target yield and the resultant plants can be harvested with conventional harvester or combine with certain row spacing).

FIG. 8 is one embodiment of a block diagram of control system (e.g., electronics and vehicle software) associated with a ground-engaging implement with position adjustment of one or more lateral rows. The control system of FIG. 8 is similar to the control system of FIG. 3 accept the control system of FIG. 8 further includes a row lateral position sensor and a row lateral actuator, consistent with the row units illustrated in FIG. 5E and FIG. 5F, collectively, and in FIG. 5G.

FIG. 9A shows a plan view of a seed row 907 of seeds planted in the ground in a generally linear row spaced apart from a nutrient strip 903 (e.g., fertilizer, nitrogen or anhydrous ammonia) in the soil by a substantially uniform distance or lateral separation 901. As illustrated, the seeds within the seed row 907 are planted with a uniform seed-to-seed spacing 902, pitch or density. The nutrient strip 903 can be placed in lateral separation range 906 between a minimum lateral separation 905, as indicated by the dashed line, and a maximum lateral separation 904, as indicated by linear or curved segments composed of alternating double-dots and long dashes. As illustrated the nutrient strip 903 is at an intermediate or medium lateral separation within the lateral separation range 906. Although one seed row 907 and a corresponding nutrient strip 903 are illustrated in FIG. 9A, in practice any number of seed rows and corresponding nutrient strips may be arranged in a substantially parallel manner in linear, curved, contour or spiral arrangements, among others.

Any of the embodiments of the row units, for the implements, described in this document can be used to plant the seeds and apply the nutrients in accordance with the pattern of FIG. 9A. For example, the row units of FIG. 5A through FIG. 5H can be used to plant the seeds and apply the nutrient with uniform lateral spacing between the planted seed row and applied nutrient strip.

FIG. 9B shows a plan view of a row of seeds planted in a generally linear row with variable seed density and spaced apart from fertilizer or nutrient in the soil by a variable distance or separation. The pattern of planted seed and applied nutrient is similar in FIG. 9A and FIG. 9B, except: (1) the seed-to-seed spacing (910, 912), seed pitch or seed density is variable in FIG. 9B and (2) the lateral separation (908, 909) between the seed row 917 and the nutrient strip 913 is variable. For example, the lateral separation (908, 909) between the seed row 917 and nutrient strip 913 varies proportionally to the seed density or changes in the seed density, such that: (1) the nutrient strip 913 has a first lateral separation 908 (e.g., closest or closer lateral separation) adjacent to a maximum or greater seed density 910 in the seed row 917; (2) the nutrient strip 913 has a second lateral separation 909 (e.g., farther lateral separation 909) adjacent to the lesser, minimum or mean seed density 912 in the seed row 917. Although one seed row 917 and a corresponding nutrient strip 913 are illustrated in FIG. 9B, in practice any number of seed rows and corresponding nutrient strips may be arranged in a substantially parallel manner in linear, curved, contour or spiral arrangements, among others.

The implement that is equipped with one or more row units shown in FIG. 5E and FIG. 5F, collectively, can achieve the pattern of the planted seed row and nutrient strip illustrated in FIG. 9B. Advantageously, the lateral separation (908, 909) can be varied within the lateral separation range 906 on a dynamic basis as the implement traverses through the field, where the seed density is tracked via a seed metering device, an implement location-determining receiver 66, and or a vehicle location-determining receiver 34.

Figure 9C:
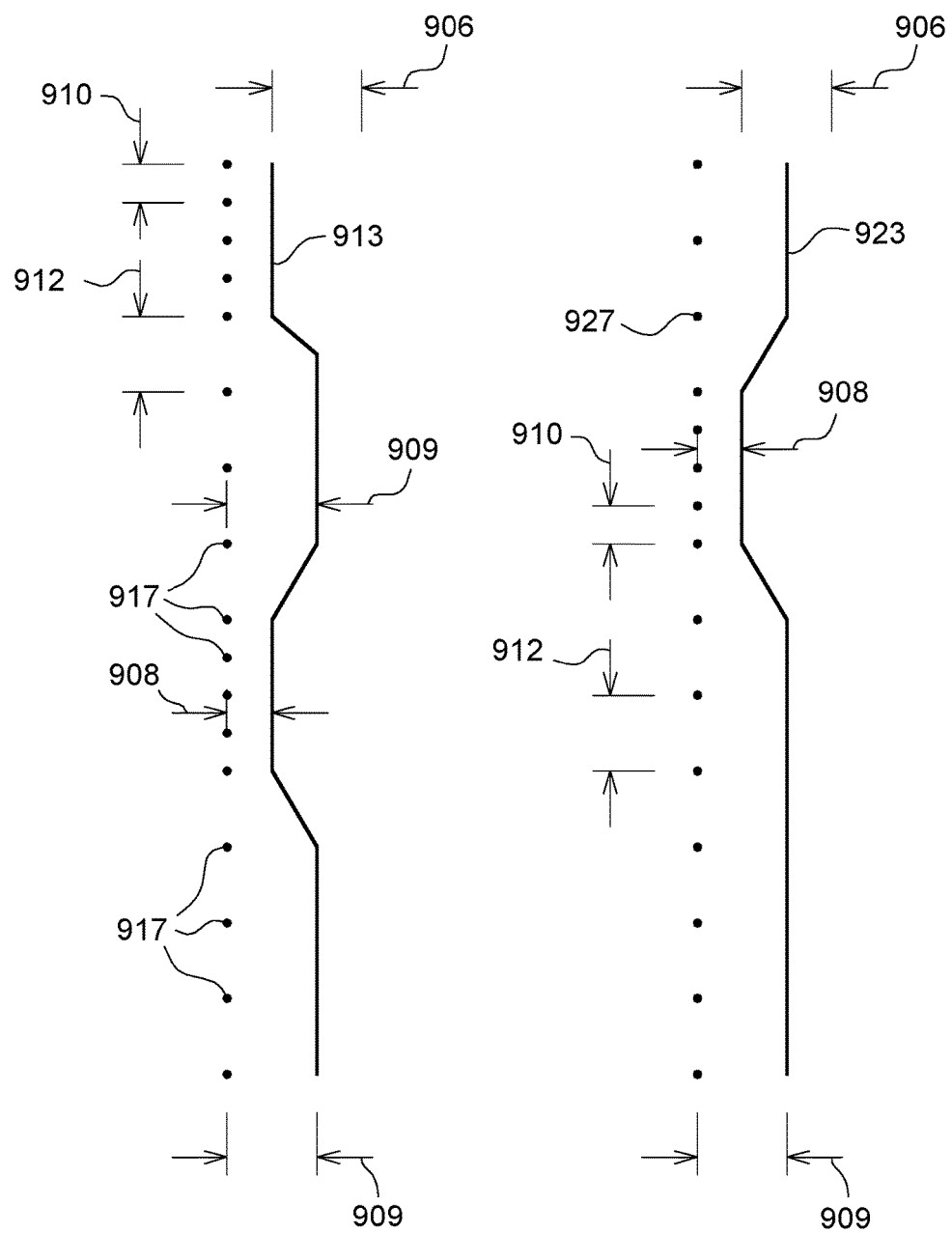
FIG. 9C shows a plan view of two adjacent rows of seed planted in generally linear rows with variable seed density and spaced apart from fertilizer or nutrient in the soil by a variable distance or separation, where the seed density and variable distance can be independent of each other in adjacent rows.

FIG. 9C shows a plan view of two adjacent seed rows (917, 927) planted in generally linear rows with variable seed density and spaced apart from fertilizer or nutrient strips (913, 923) in the soil by a variable distance or separation, where the seed density (910, 912) and variable lateral separation (908, 909) can be independent of each other in adjacent rows. The pattern of planted seed and applied nutrient is similar in FIG. 9B and FIG. 9C, except: (1) the seed-to-seed spacing 912, seed pitch or seed density is variable in two adjacent rows, and the seed-to-seed spacing 912 of the two adjacent rows may be varied independently with respect to each other or in with some other relationship between the two adjacent rows; (2) the first lateral separation (908, 909) between the seed row 917 and the corresponding nutrient strip 913 is variable; (3) the second lateral separation (908, 909) between the seed row 927 and the corresponding nutrient strip 923 is variable. For example, the lateral separation (908, 909) between the seed row 917 and nutrient strip 913 varies proportionally to the seed density or changes in the seed density of the adjacent seed row 917, such that: (1) the nutrient strip 913 has a primary lateral separation 908 (e.g., closer, closest or minimum lateral separation) adjacent to the greater or maximum seed density 910 in the seed row 917; (2) the nutrient strip 913 has a secondary lateral separation 909 (e.g., farther lateral separation) adjacent to the lesser, minimum or mean seed density 912 in the seed row 917. Although two seed rows (917, 927) and a corresponding nutrient strips (913. 923) are illustrated in FIG. 9C, in practice any number of seed rows and corresponding nutrient strips may be arranged in a substantially parallel manner in linear, curved, contour or spiral arrangements, among others.

The implement that is equipped with one or more row units shown in FIG. 5E and FIG. 5F, collectively, can achieve the pattern of the planted seed row and nutrient strip illustrated in FIG. 9B. Advantageously, the lateral separation (908, 909) can be varied within the lateral separation range 906 on a dynamic basis as the implement traverses through the field, where the seed density is tracked via a seed metering device, an implement location-determining receiver 66, and or a vehicle location-determining receiver 34.

Figure 10:
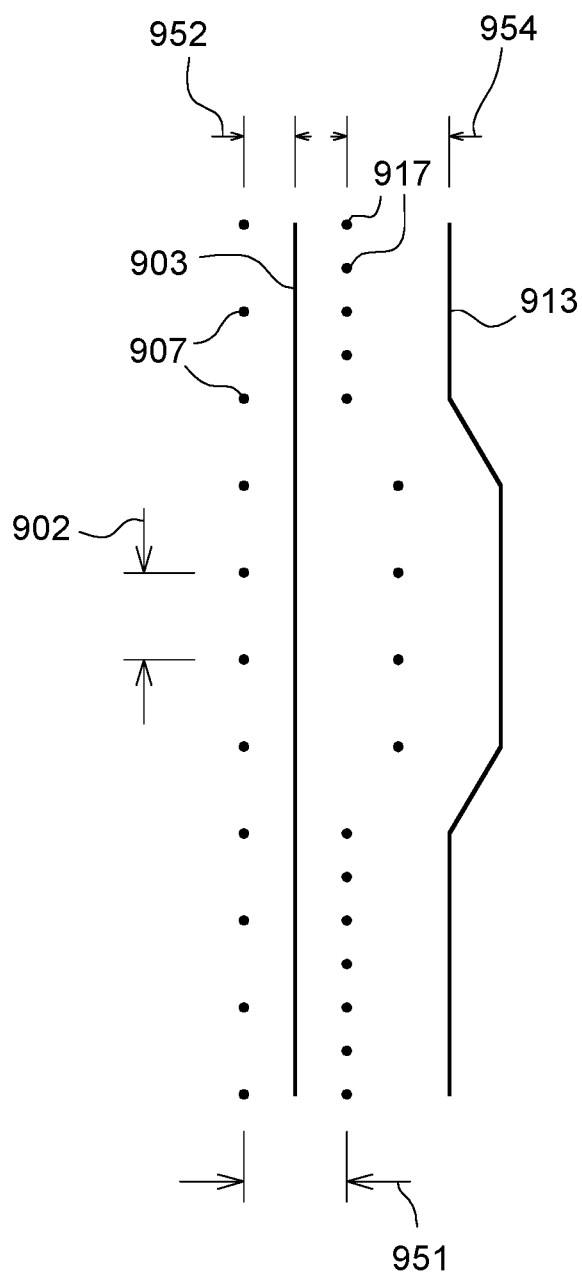
FIG. 10 shows a plan view of two adjacent rows of seed, where the separation between seed and nutrient within a given row is fixed, and where the separation between adjacent rows is variable.

FIG. 10 shows a plan view of two adjacent seed rows (907, 917) of seed, where the lateral separation 952 between seed row 907 and a respective nutrient strip 903 within a given aggregate row is fixed, where the lateral separation 954 between seed row 917 and a respective nutrient strip 913 is fixed, and where the lateral separation 951 between adjacent seed rows (907, 917) is variable. As used herein, an aggregate row includes a seed row (907 or 917) and respective nutrient strip (903 or 913).

The implement that is equipped with one or more row units shown in FIG. 5G and FIG. 5H, collectively, can achieve the pattern of the planted seed row and nutrient strip illustrated in FIG. 9B in one pass of the row unit that simultaneously plants seed and applies the corresponding nutrient strip. Advantageously, the lateral separation 951 can be varied within the lateral separation range on a dynamic basis as the implement traverses through the field, where the seed density is tracked via a seed metering device, an implement location-determining receiver 66, and or a vehicle location-determining receiver 34.

In one example, the implement data processor 52 varies the lateral separation between a first seed row of planted seed and a second seed row based on the seed density of the first seed row from the observed seed density or the observed seed spacing. In another example, the implement data processor 52 can decrease the lateral separation between the first seed row of planted seed and the second seed row for an increased seed density or a maximum seed density associated with a particular respective position, zone or region in the first seed row and the second seed row, collectively. Conversely, the implement data processor 52 can increase the lateral separation between the first seed row of planted seed and the second seed row for a decreased seed density or a minimum seed density associated with a particular respective position, zone or region in the first seed row and the second seed row, collectively. In one embodiment, the implement data processor 52 limits the lateral separation between a first seed row of planted seed and a second seed row based on the row spacing limits associated with a harvester or a combine for harvesting crop resulting from the planted seed rows.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The following is claimed:

1. A ground-engaging agricultural implement system, the implement system comprising:
   a front member;
   a hitch connected to the front member, the hitch associated with a hitch angle sensor for estimating an observed implement angle with respect to the front member, a vehicle heading, or to a longitudinal axis of a vehicle for pulling the hitch;
   a first rear member spaced apart from the front member and positioned generally parallel to the front member;

a first pair of first pivotable arms generally parallel to each other, the first pair of first pivotable arms rotatably connected to the front member, or a section thereof, at pivot points;

the first pair of first pivotable arms rotatably connected to the first rear member at pivot points;

at least one first opener or first row unit extending downward from or with respect to the first rear member;

a first actuator with a first end and a second end opposite the first end, the first end coupled to one of the first pivotable arms, the second end coupled to the front member or to the first rear member to adjust a first lateral position of the first opener or first row unit with respect to the front member; and a first position sensor for estimating the first lateral position of the first opener or first row unit with respect to the front member, the first position sensor estimating the first lateral position based on an angle between any first pivotable arm and the front member or the first rear member;

a data processor for determining whether a draft force on the implement is unbalanced based on an error between the observed implement angle and a target implement heading exceeding a threshold deviation; the data processor generating a control signal to compensate for the imbalance in the draft force by adjusting the first lateral position via the first actuator, or by adjusting the second lateral position via the second actuator, the first actuator and the second actuator being positioned on opposite lateral sides of the implement.

2. The implement according to claim 1 wherein the hitch angle sensor comprises:

a magnet secured to the hitch;

a magnetic field sensor associated with a vehicle for pulling the implement, the magnetic field sensor detecting a change in the magnetic field associated with the magnet indicative of an observed implement angle of the implement, or its front member, with respect to a longitudinal axis of the vehicle.

3. The implement according to claim 2 wherein the magnet is secured to an upper hitch point of the hitch.

4. The implement according to claim 1 further comprising:

an implement location-determining receiver for determining a position of the implement or a reference position associated with the front member, the implement location-determining receiver estimating an observed implement heading at the position;

an implement data processor retrieving the target implement heading from a data storage device associated with the respective position.

5. The implement according to claim 1 further comprising:

a first force sensor associated with a frame member of the first row unit to detect a first draft force associated with the first ground-engaging element; and a second force sensor associated with a frame member of the second row unit to detect a second draft force associated with the second ground-engaging element.

6. The implement according to claim 5 further comprising:

an implement data processor for independently or collectively adjusting the first lateral position of the first ground-engaging element and the second lateral position of the second ground-engaging element to balance or equalize the first and second draft forces, wherein the first ground-engaging element is located on one side of the implement longitudinal axis and wherein the second ground-engaging element is located on an opposite side of the implement longitudinal axis.

7. The implement according to claim 5 further comprising:

an implement data processor for independently or collectively adjusting the first lateral position and first vertical position of the first ground-engaging element and the second lateral position and second vertical position of the second ground-engaging element to balance or equalize the first and second draft forces, wherein the first ground-engaging element is located on one side of the implement longitudinal axis and wherein the second ground-engaging element is located on an opposite side of the implement longitudinal axis.

8. The implement according to claim 1 further comprising:

data processor generating a control signal to actuate the first actuator or the second actuator to move one or more ground-engaging elements laterally outward from the implement to reduce or minimize the error.

9. The implement according to claim 1 further comprising:

an implement data processor for independently adjusting the first lateral position of a first ground-engaging element and the second lateral position of the second ground-engaging element in opposite directions to balance or equalize the draft forces, wherein the first ground-engaging element is located on one side of the implement longitudinal axis and wherein the second ground-engaging element is located on an opposite side of the implement longitudinal axis.

10. The implement according to claim 1 further comprising:

an implement data processor for reducing the downforce or downward pressure on one or more ground-engaging elements on one side of the implement with respect to the other ground-engaging elements on the other side of the implement to reduce or minimize the error.

* * * * *